United States Patent [19]
Poole et al.

[11] 3,986,011
[45] Oct. 12, 1976

[54] PRINTER-PLOTTER SYSTEM

[75] Inventors: John S. Poole; H. Blair Muhlestein, both of Wilmington, Del.; Douglas H. Smith, Avondale, Pa.; Lennart Bilen, Wilmington, Del.

[73] Assignee: Hewlett-Packard Company, Palo Alto, Calif.

[22] Filed: Feb. 24, 1975

[21] Appl. No.: 552,094

[52] U.S. Cl. .................... 235/151.22; 340/172.5; 346/33 R; 346/63; 444/1; 235/151.35
[51] Int. Cl.² .................... G06F 3/12; G06K 15/02
[58] Field of Search ......... 235/151.22, 151, 151.35; 73/23.1; 340/172.5; 101/93.05; 219/216; 346/33 R, 49, 63; 444/1

[56] References Cited
UNITED STATES PATENTS

| | | | |
|---|---|---|---|
| 3,634,828 | 1/1972 | Myers et al. | 340/172.5 |
| 3,751,966 | 8/1973 | Ryan et al. | 235/151.35 |
| 3,809,865 | 5/1974 | DiMeo | 235/151 |

*Primary Examiner*—Edward J. Wise
*Attorney, Agent, or Firm*—Stephen P. Fox; Robert S. Hulse; Theodore Scott Park

[57] ABSTRACT

A gas chromatograph system includes a central processor (CPU) and a printer-plotter. The printer-plotter prints characters and plots data using a single 1 by 7 array of thermal resistors to perform both the printing and plotting operations in real time. The system provides continuous and uniform traces despite changes in the plotting rate.

Data from the chromatograph is temporarily stored by the CPU, then forwarded upon programmed command through a print-plot controller to the printer-plotter. Data is plotted as it is received from the CPU. As peaks in the data are detected, plotting is suspended temporarily without loss of data, and characters are printed adjacent to the peaks, thus annotating the peaks with digital data.

5 Claims, 25 Drawing Figures

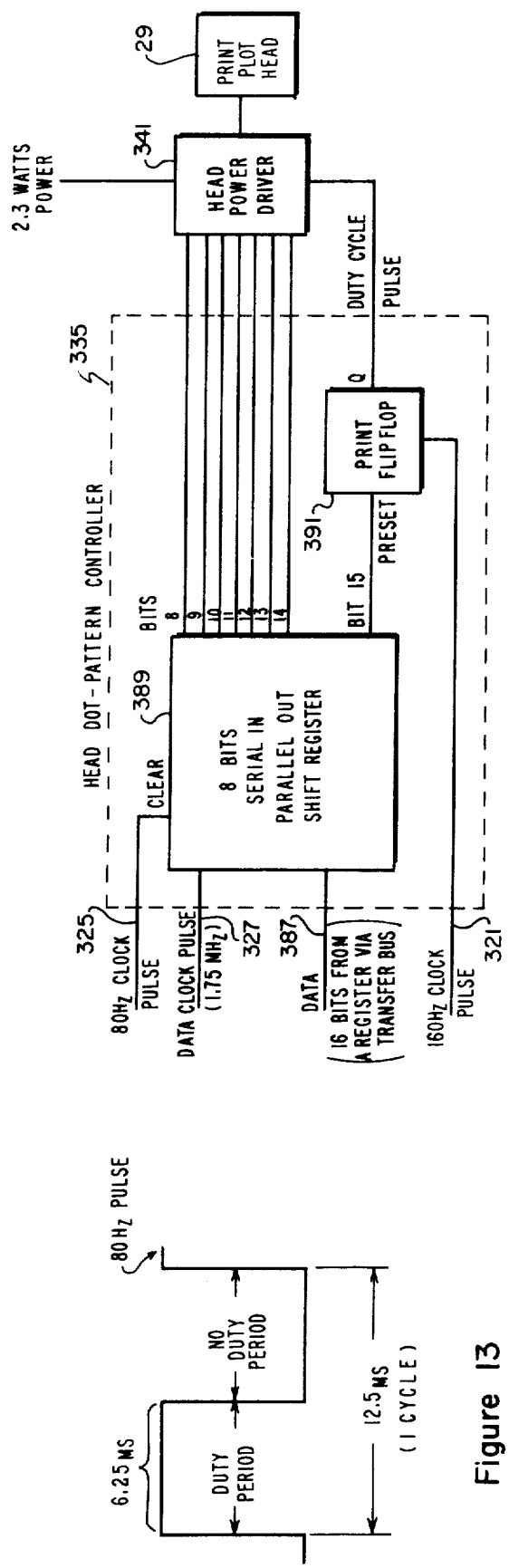

PRINTER-PLOTTER SYSTEM

BACKGROUND OF THE INVENTION

The present invention relates generally to gas chromatography systems and more particularly to a system for presenting output data.

Heretofore, plotted reports generated by gas chromatograph systems have been in the form of analog curves traced by stripchart or other pen recorders interfaced to the chromatograph system. One disadvantage of such reports is that the analog curves provide no real time printed explanation of the plotted data in alphanumeric form. In order to obtain alphanumeric information relating to analog curves, teletypewriters or other printers have been used; however, such printers are separate components and generally part of a computer system which is externally interfaced to a gas chromatograph. Furthermore, problems result in obtaining analog curves from one device and alphanumeric data from another device. The plotted curves must be correlated with the alphanumeric data, and the curve peaks and segments must be accurately identified with respect to components of the sample being analyzed. This correlation process is performed manually. It is time consuming and subject to human error.

SUMMARY OF THE INVENTION

The present invention provides a printer-plotter system for a gas chromatograph system that plots analog curves and also prints alphanumeric information adjacent to selected points of the curves, thereby to annotate the curves. The plotting and printing is performed in real time, on the same sheet of paper. A single movable head is used for both plotting and printing.

According to the illustrated embodiment of the system incorporating the present invention, a gas chromatograph has a detector which provides digital signals to an associated central processor unit (CPU). The CPU operates on the detector output data and holds it for transmittal in proper format to a printer-plotter unit. On command, the printer-plotter plots a curve in response to the digital output of the detector. When component peaks are detected in the sample under analysis, plotting is suspended temporarily without loss of data, and characters are printed adjacent to the peaks. Both printing and plotting are achieved by a 1 by 7 array of thermal resistors in the movable head.

The printing of each character and the plotting of each data value are controlled by the print-plot controller, upon command from the CPU. The print-plot controller includes four control units that control the individual operations of the print-plot head of the printer-plotter. In particular, a head position controller controls the movement of the print-plot head from position to position across the plottable width of the plotting paper. It does this by enabling power to a head-position driver so as to move the head to the desired position, and by monitoring the position of the head to determine if it has reached its desired position. Each position to which the head is to be moved is previously calculated by the CPU in response to data from the gas chromatograph detector. Data values are plotted using only one thermal resistor in the head.

A head dot-pattern controller determines when character printing is to be performed, and enables dot-pattern information from the CPU to pass to a head power driver which selectively energizes one or more of the seven thermal resistors in the head for printing. Characters are printed in dot matrix form, 5 columns by 7 rows. The columns of each character are printed one at a time, in sequence. The dot pattern representing each character is stored in the memory of the CPU. Upon command from the CPU, the dot pattern corresponding to the column to be printed is transferred from the CPU memory to the dot-pattern controller and thence to the head power driver which enables power to those of the seven thermal resistors of the head that match the dot pattern.

A constant power is applied to the head for printing characters, and a varying power is applied to the head for plotting data values. In the plotting mode, head velocity changes as the difference in distance between successive data values changes, and the power pulses applied to the head are varied accordingly by a head controller. First, the CPU calculates the velocity of the head when it moves from one position to another, and the power, as a function of head velocity, needed to produce a uniform trace. The CPU then applies this calculated power value to the head power controller which converts the calculated value to a duty cycle representing the frequency and time duration of power pulses applied to the head.

A chart step controller/driver causes the plotting paper to be advanced a predetermined distance on command by the CPU.

BRIEF DESCRIPTION OF THE DRAWINGS

FIG. 13 is a waveform diagram illustrating the duty cycle of power applied to the print-plot head.

FIG. 14 is a block diagram of the head dot-pattern controller.

DESCRIPTION OF THE PREFERRED EMBODIMENT

Figure 1:
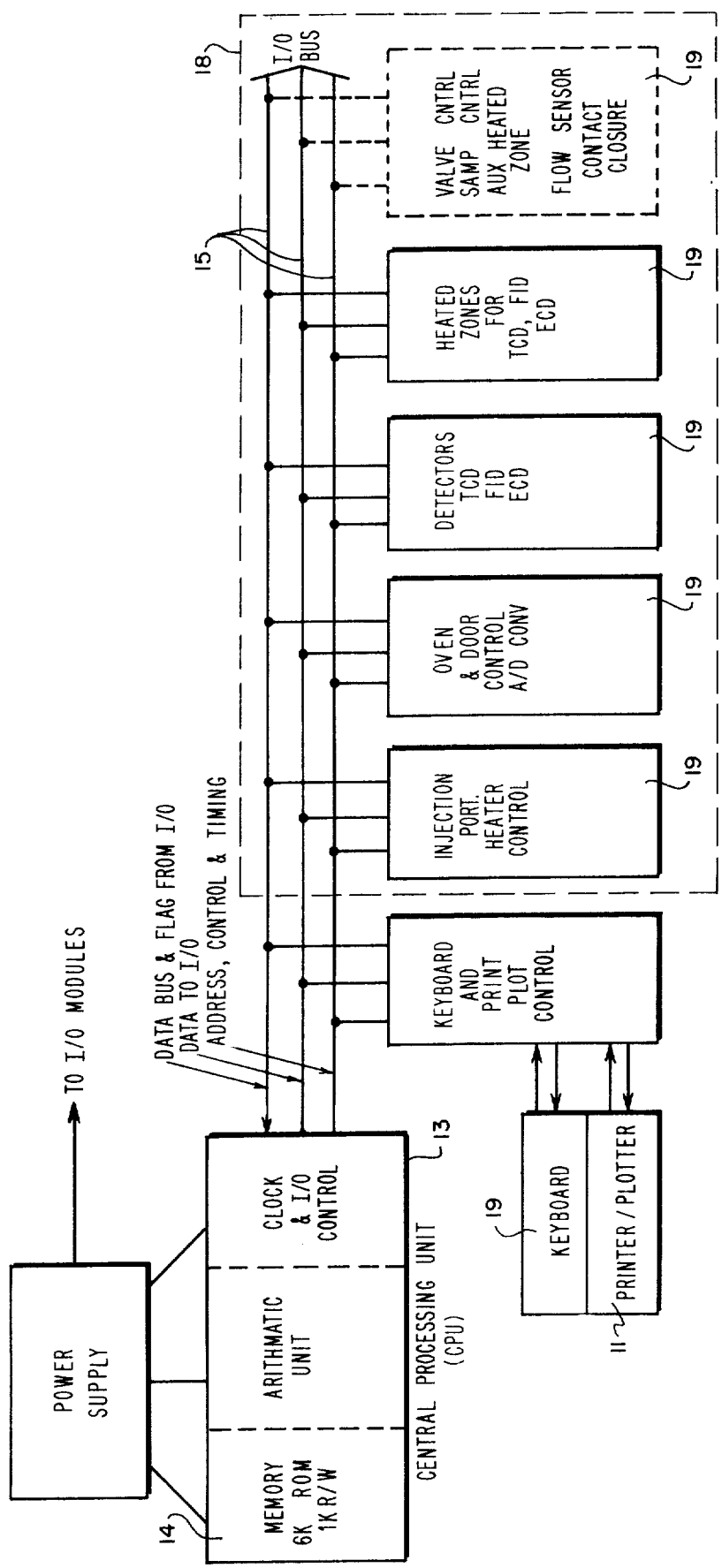
FIG. 1 is a block diagram of a digital gas chromatograph system incorporating the printer-plotter of the present invention.

The printer-plotter system may best be understood by referring first to FIG. 1 which shows the manner in which the printer-plotter 11 is incorporated into the digital gas chromatograph system. The printer-plotter 11 operates with the central processing unit (CPU) 13. Data and control information from processor 13 are routed to the printer-plotter 11 via a common input-output bus 15, shared by other components 19 of the chromatograph 18. Data from the chromatograph 18 are buffered by the CPU 13, i.e., stored temporarily in the memory 14 of the CPU, then forwarded to the printer-plotter 11 for plotting.

Figure 2:
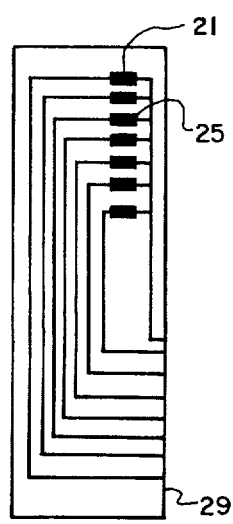
FIG. 2 is a schematic diagram of the print-plot head used in the printer-plotter.

FIG. 2 shows the print-plot head 29 of the printer-plotter 11. In the printer-plotter system 11, a means is provided for printing and plotting chromatograph data in real time, using a single 1 by 7 vertical array of thick film resistors 21 contained in a print-plot head 29. All seven resistors 21, individually energized, are used to print characters. A single resistor 25 is used to plot data values.

Also provided in the printer-plotter 11 is a means of achieving uniformity of trace by velocity modulation of the power applied to the print-plot head 29, under CPU 13 control, as described hereinafter.

Figure 3:
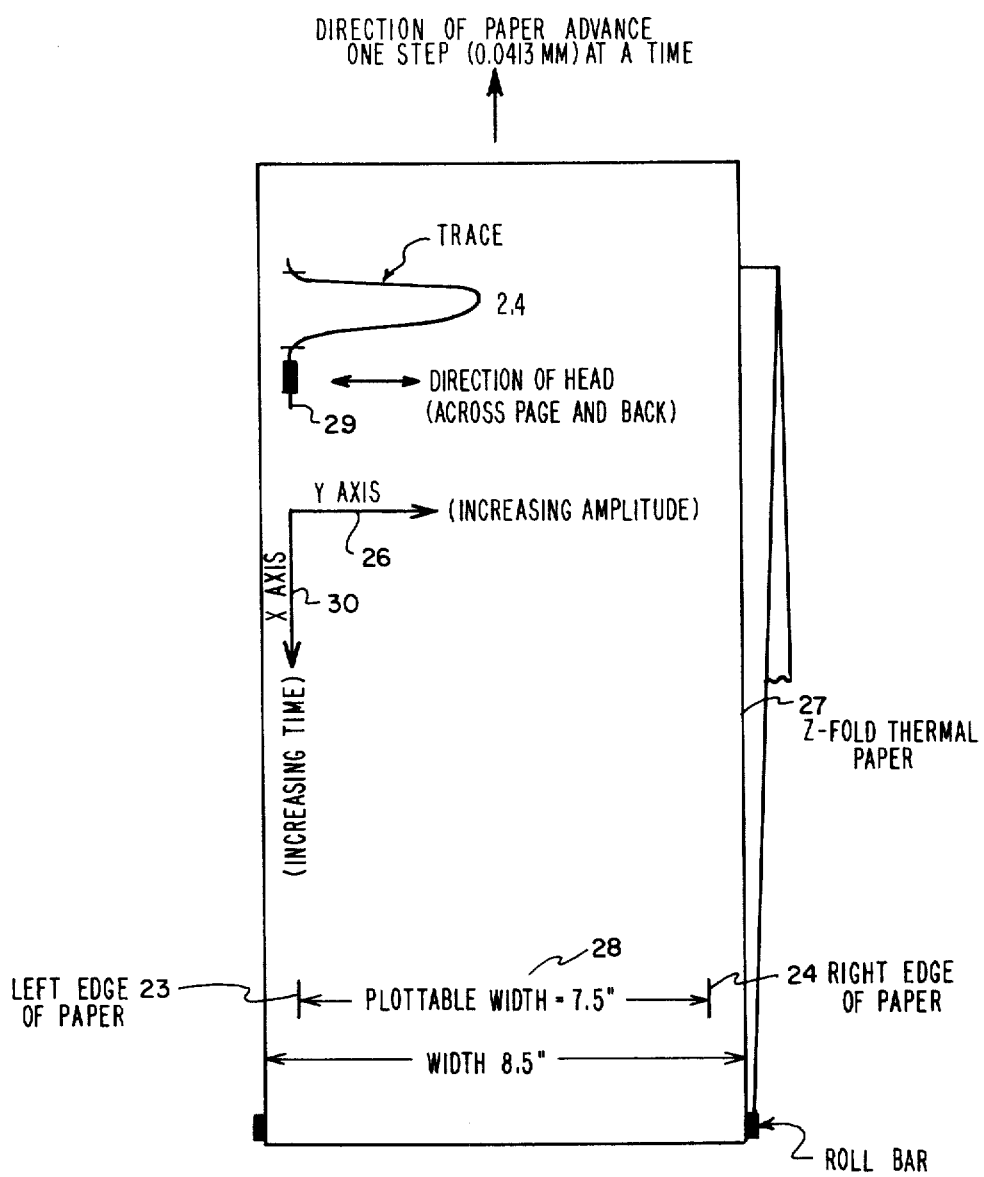
FIG. 3 is one version of the system output report illustrating a plotted curve, associated alphanumeric information, and the direction of motion of the recording paper and print-plot head.
Figure 4:
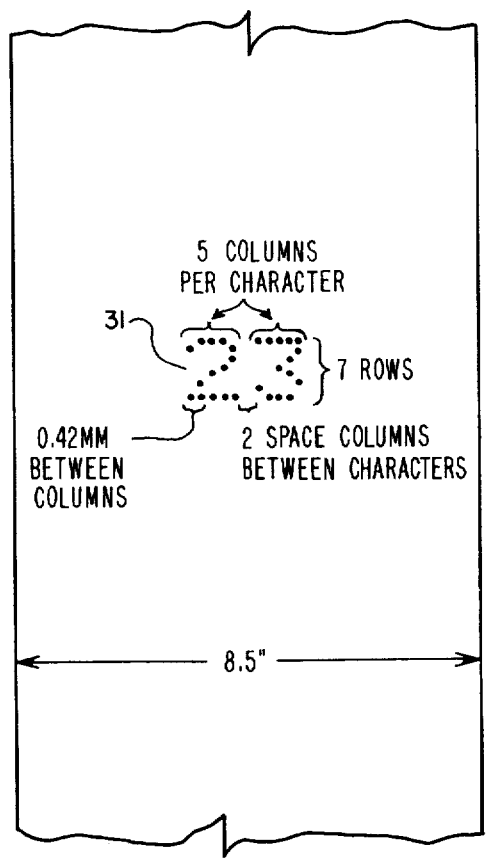
FIG. 4 is an enlarged view of the system output report illustrating the format of printed characters.

FIG. 3 illustrates the direction of the print-plot paper 27 and the direction of the print-plot head 29, during printing and plotting of data. When a character is to be printed, the head 29 is moved across the paper 27 one position at a time equivalent to 0.42 mm lateral movement (along the Y axis 26), with selected resistors of the array 21 (FIG. 2) activated by programmed command from the CPU 13 (FIG. 1), so as to form 1/5 of the character at a time. More particularly, as FIG. 4 shows, each character 31 is printed in a 5-column by 7-row dot matrix format. Each of the five columns is printed one at a time as the head 29 moves across the paper. When a line of characters has been printed, the head 29 returns to the left edge 23 (FIG. 3) of the paper 27 and the paper is advanced to the next line. If plotting is to be resumed after printing, the head 29 returns to the position of the last plotted data value. When data values are to be plotted, a single resistor 25 (FIG. 2) is activated by programmed command from the CPU 13 (FIG. 1). This resistor 25 is maintained in active status as the head 29 is moved from data point to data point across the page 27, until no more data values remain to be plotted or until data characters are to be printed. Both printing and plotting operate under program control.

Figure 5:
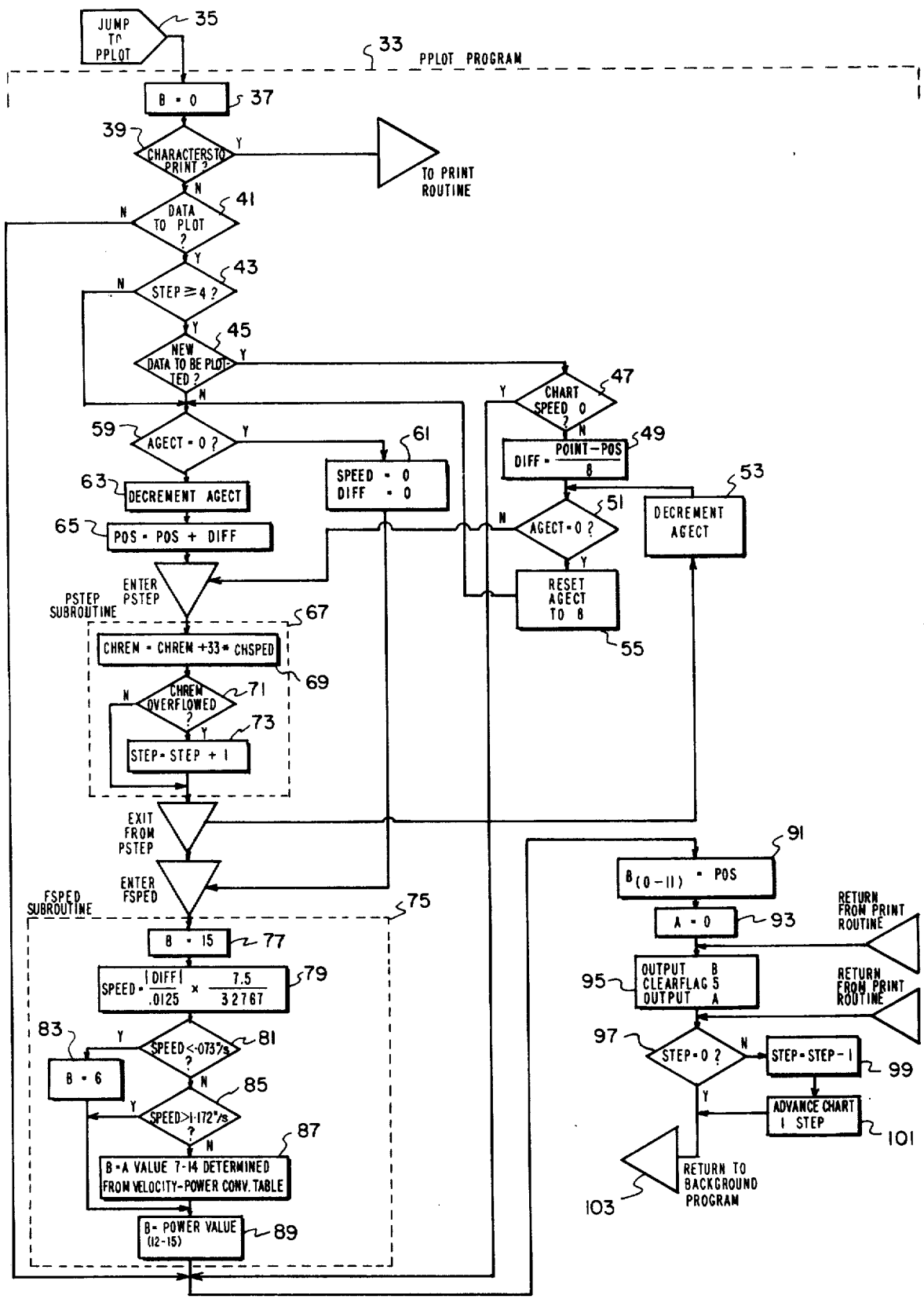
FIG. 5 is a logic flow diagram illustrating one mode of operation of the system incorporating the present invention.

FIG. 5, a block diagram employing conventional flow chart symbols, illustrates the print-plot control program. The various blocks represent processes performed and decisions made with respect to the status of a number of variables used in the print-plot process. The lines connecting one block to another illustrate the sequence of these processes and decisions. buffered The plotting of a data point or the printing of one column of a character is performed every 0.0125 second. To accomplish this printing or plotting, a print-plot program, PPLOT 33, is executed every 0.0125 second upon transfer of control from a background program to PPLOT, as shown by block 35. Data for plotting from the chromatograph 18 (FIG. 1) are received by the CPU 13 at the rate of one data value every 0.1 second. This data is bufferec (i.e., temporarily stored in memory) by the CPU 13, then transferred by the program PPLOT from the CPU 13 to the printer-plotter 11 for plotting. Because PPLOT plots every 0.0125 second, which is a rate 8 times faster than the .1 second data rate, PPLOT is able to plot data, suspend plotting temporarily so as to print characters adjacent to the peak of the data curve plotted (as shown in FIG. 3), and resume plotting, without significant loss of accuracy. PPLOT interpolates linearly between consecutive data values deriving seven interpolated values between data values.

As described above, the printer-plotter 11 (FIG. 1) is able to print and plot faster than the data rate. This is accomplished through the use of the PPLOT program 33 (FIG. 5). The ability of the printer-plotter 11 (FIG. 1) to print and plot faster than the data rate, together with the buffering of the data by the CPU 13 enables the printer-plotter 11 to perform printing and plotting operations in real time, i.e., to print or plot within 0.1 second, which is the data period within which data is generated by the chromatograph 18, buffered by the CPU 13 and transferred to the printer-plotter 11 for plotting.

The following describes how the decision is made by PPLOT 33 (FIG. 5) to print or plot and how PPLOT calculates the position of the print-plot head for the next data value to be plotted. Initially, the B register 302 (FIG. 7) of the CPU 13 (FIG. 1) is set to zero as indicated by block 37. This step is preparatory to later storage of head power and head position information in the B register 302. If characters are scheduled for printing, as block 39 illustrates, control is transferred to the PRINT routine 201, at block 203. Otherwise, as block 41 shows, if no characters are scheduled for printing but data exists to be plotted, block 43 is executed. If no data exists to be plotted, block 91 is executed next. At block 43, before plotting any data, PPLOT 33 first determines if the chart paper 27 (FIG. 3) needs to be advanced. Advancing the chart paper 27 one step is equivalent to an advance of 0.0413 mm. As block 43 shows, if the chart lags by 0.1652 mm or more (i.e., lags by 4 steps or more), it is considered to be behind. In this case if a new data value is received from the chromatograph 18 (FIG. 1) for plotting (as tested for in block 45) before a previously received value has been plotted, PPLOT 33 does not plot the previously received value but derives new interpolated values between the last data point plotted and the new data value received. However, before preparing to derive new interpolated values, PPLOT 33 tests the chart speed as shown in block 47. If the chart speed is zero, this indicates that the chart paper 27 (FIG. 3), and hence the chromatographic analysis, has stopped and PPLOT 33 proceeds to block 91. If the chart speed is not zero, PPLOT 33 (as block 49 shows) prepares to derive seven newly interpolated values from the then present position of the print-plot head 29 represented by the variable POS, up to the position corresponding to the new data value represented by the variable POINT, by calculating ⅛ of the distance between the new value and the head position. The variable POINT is used to represent each new value received from the chromatograph 18 (FIG. 1), converted from inches to a number in the range 0 to 32767 by the relationship:

$$POINT = \frac{New\ Value \times 32767}{7.5}$$

where 7.5 is the plottable width of the paper 28 (FIG. 3), in inches. In the event the chart 27 is not to be advanced, or if no new data is received from the chromatograph 18 (FIG. 1) for plotting, a test is made, as shown by block 59 to determine if all seven interpolated points and the last received data value (8 points total) have been plotted. If data points remain to be plotted, the count is decremented as shown in block 63 and, as indicated in block 65, a new position of the print-plot head 29 (FIG. 3) is calculated corresponding to the data point to be plotted. The plottable width 28 of the paper 27 is divided into 32768 logical segments representing the values 0 to 32767. Data points are first converted to this 0 to 32767 scale before being plotted. The POS variable in block 65 represents the position to which the print-plot head 29 is to be moved. This position is computed by incrementing or decrementing the previous position of the head by an amount equal to the difference between interpolated points. This difference was previously calculated as shown in block 49.

The preceding describes how the PPLOT program 33 calculates the position of the print-plot head 29 (FIG. 3) corresponding to the next data point to be plotted. The following describes how PPLOT 33 prepares to advance the chart 27, by calculating "chart steps" proportional to the chart speed selected by the chromatograph operator. Following the calculation in block 65 of the next head position, control is transferred to subroutine PSTEP 67 which increments a step-counter variable if the chart 27 is to be advanced a step. This procedure of incrementing a step-counter variable is shown in block 73. Whenever a chart advance command is executed by PPLOT 33, as shown in block 101, the chart advances one step equivalent to 0.0413 mm.

As block 71 shows, the decision to advance the chart one step, coincident with the plotting of a particular data point during a particular execution of PPLOT, is made to depend on overflow of a control variable CHREM. Overflow of CHREM is used because of the ease in testing for an overflow condition, as shown by block 71, whenever the variable is incremented. As illustrated in block 69, this control variable CHREM is incremented in a manner proportional to the chart speed specified by the equipment operator via the keyboard 19 (FIG. 1), at the start of the chromatographic analysis. This proportionality factor, shown as thrity-three in block 69, is derived as follows:

$$0.01_{cm/min} \times 10_{mm/cm} \div 60_{sec/min} = 1/600\ mm/sec \quad (1)$$

$$1/600\ mm/sec \times 0.0125\ sec = 125/6,000,000\ mm/0.0125\ sec \quad (2)$$

$$125/6,000,000\ mm/0.0125\ sec \div 0.0413_{mm/step} = 10/19,824\ steps/0.0125\ sec \approx 33/65,536\ steps/0.0125\ sec \quad (3)$$

where 0.01 cm/min is the unit for all chart speed values that may be specified by an operator, 0.0125 seconds is the time it takes to plot a point each time the program PPLOT is executed, 0.0413 mm/step is the amount the chart is advanced each step, and 65536 is the overflow value of a 16-bit computer word representing the variable CHREM. As illustrated by blocks 71 and 73, if overflow occurs, the variable STEP is incremented, otherwise it is not; following which, exit is made from the PSTEP subroutine 67 to the FSPED subroutine 75.

As described above, in the operation of the PPLOT program 33, the decision is made whether or not to advance the chart 27 (FIG. 3). As described hereinafter, the velocity of the head 29 is calculated, together with the amount of power that must be applied to the head 29 as the head velocity changes, in order to ensure a uniform trace. Depending on the velocity of the head 29 power values are selected as shown in Table 1. Maximum power is 1140 milliwatts, minimum power is 456 milliwatts or 6/15 of maximum power. The table values are derived from the following:

TABLE 1

| VELOCITY—POWER CONVERSION TABLE | |
|---|---|
| Velocity (inches/sec) | Power (1140/15) mw |
| <.073 | 6 |
| .073 – .109 | 7 |
| .11 – .146 | 8 |
| .147 – .219 | 9 |
| .22 – .293 | 10 |
| .294 – .439 | 11 |
| .44 – .586 | 12 |
| .587 – .879 | 13 |
| .88 – 1.172 | 14 |
| >1.172 | 15 | equation relating head power in milliwatts to head velocity in inches per second:

$$P_{mw} = 532 + 219\ \ln Hv/Hv_{min} \quad (4)$$

where Hv is the head velocity at any instant in time, $Hv_{min}$ is the minimum head velocity of 0.072 inches/second and $P_{mw}$ is power expressed in milliwatts necessary to maintain a uniform trace.

As indicated by block 77, full power is initially assumed to be required for plotting. The speed or velocity in inches per second of the head 29 is then calculated as indicated in block 79 where |DIFF| is the absolute value of the distance between two interpolated data points expressed as a 15-bit computer-word value in the range 0 to 32767, the time 0.0125 seconds is the the PPLOT program 33 takes to plot a point, 7.5 is the plottable width of the paper 28 in inches, and 32767 is the plottable width of the paper expressed as a 15-bit computer value.

Figure 7:
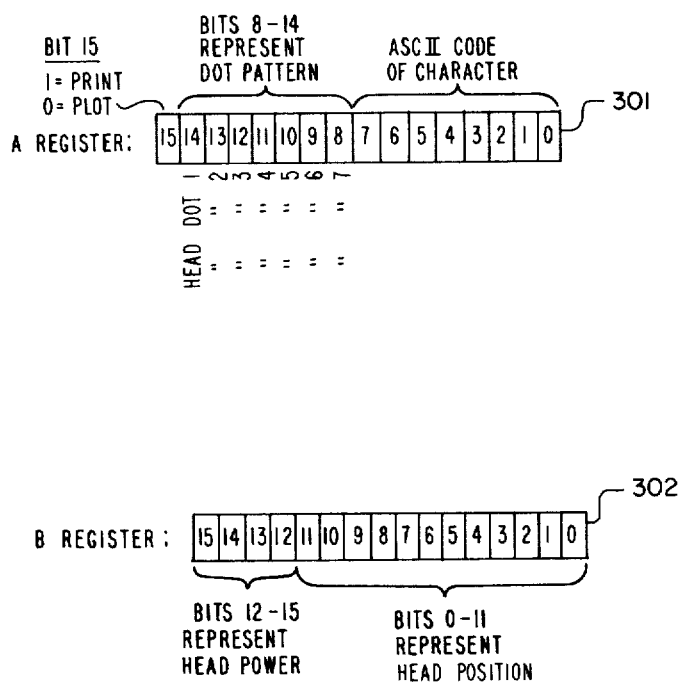
FIG. 7 is a diagramatic illustration of two data registers in the central processing unit of the system.

As indicated in Table 1 and as illustrated by blocks 81, 83, 85 and 87, if the speed (velocity) of the print-plot head 29 is found to be less than 0.073 inches per second, a power factor of 6 (representing 6/15 of maximum power, where maximum power is 1140 milliwatts) is chosen; if the head speed is in the range 0.073 to 1.172 inches per second a corresponding power factor in the range 7 to 14 is selected; and, if the head speed is greater than 1.172 inches per second a power factor of 15 equivalent to the maximum power of 1140 milliwatts is selected. After the power factor is chosen it is stored, as block 89 indicates, in the most significant four bits of the B register 302 (FIG. 7). The head posiion information previously calculated in block 65 is also stored in the B register 302, in the least significant twelve bits, as indicated by block 91.

After calculating head velocity and head power information, PPLOT 33 then prepares to output to the print-plot head 29 (FIG. 3) the power factor selected. The A register 301 (FIG. 7) is used to specify whether printing or plotting is to be performed and the dot pattern to be used, i.e., the particular resistor elements 21 (FIG. 2) that are to be energized. As block 93 shows, the A register 301 is set to zero when plotting is to be performed. Thereafter, as block 95 shows, when this zero value is output to the print-plot controller 303 (FIG. 8) from the A register 301 of the CPU 13, the third element of the resistor array 25 (FIG. 2) is energized for plotting.

If printing is to be performed, as hereinafter described, the sign bit (i.e., the 16 bit expressed as bit 15 of a word containing bits zero through 15) of the A register 301 (FIG. 7) is set to one indicating that printing is to be performed, and bits eight through 14 are set to the dot pattern corresponding to a column of the character 31 (FIG. 4) to be printed. Following the selection and output of dot pattern information from the A register 301 (FIG. 7), as block 95 shows, a power and head position information previously stored in the B register 302, as indicated by blocks 89 and 91, are output to the print-plot controller 303. After which, as blocks 97, 99 and 101 show, the chart paper 27 (FIG. 3) is advanced one step (0.0413 mm) if the STEP count previously accumulated in block 73 is non-zero. If the STEP count is nonzero, it is decremented prior to advance of the chart 27. If at block 97 the STEP count was found to be zero, the chart 27 is not advanced. Following the decision at block 97 to advance or not advance the chart, control is returned by PPLOT 33 to the background program from which it has received control at block 35.

Execution of PPLOT 33 occurs every 0.0125 seconds or eight times every 0.1 second. A variable AGECT is used to record this frequency of execution. Initially this variable is set to eight as shown in block 55 and decremented by one each time PPLOT 33 is executed, as shown in block 63, until AGECT becomes zero. When AGECT is zero this indicates that eight points (seven interpolated points and the last data value received) have been plotted and that no new data value has been received by PPLOT 33 for plotting, in which case, as blocks 59 and 61 show, both the chart speed variable SPEED and the DIFF variable (representing ⅛ of the difference between successive data values) are set to zero, after which execution continues at block 77 of subroutine FSPED 75. In the event a new data value is received for plotting before a previous data value is plotted (i.e., before AGECT is decremented to zero as indicated by blocks 45 and 51), the subroutine PSTEP 67 is executed repeatedly thereby incrementing the STEP variable to reflect the number of chart advances that are to be performed between the present position of the print-plot head 29 (FIG. 3) and the position corresponding to the new data value along the X or times axis 30. After each execution of PSTEP 67, AGECT is decremented by one, as shown by block 53. When AGECT is found equal to zero, it is reset to the value eight as shown by block 55, after which execution continues at block 59.

The foregoing describes how, in preparation for plotting a data point, the PPLOT program 33 calculates the position, velocity and power of the print-plot head 29, and determines when to advance the chart 27. The discussion that follows explains how characters are printed.

Block 39 of PPLOT shows that when characters are to be printed, control is transferred from the PPLOT program 33 to the PRINT program 201 (FIG. 6) at block 203. As block 203 shows, if the STEP variable is found to be zero indicating that the chart 27 (FIG. 3) position is current and that no more steps remain for the chart to be advanced at the present time, the PRINT program 201 then proceeds to block 205 to determine if any charcters remain to be printed. If the STEP variable is not zero, indicating that steps remain for the chart 27 to be advanced, then, as block 207 shows, the next position of the print-plot head 29 represented by the variable POS is calculated. The subtrahend three hundred and forty-two represents the quantum of one lateral move in the direction of decreasing amplitude along the Y axis 26 equivalent to 0.078 inches, expressed as a number in the range 0 to 32767. To effect a carriage return, i.e., the return of the print-plot head 29 to the left-most position (the Y-o position) of the paper 27, block 207 is executed repeatedly, each time that PRINT 201 is entered, until the POS variable becomes negative. As blocks 209 and 211 show, when POS becomes negative it is set to zero representing the left-most position of the paper 27. This position information, as block 213 shows, is then stored in bits zero through 11 of the B register 302 (FIG. 7). Also, because a carriage return rather than a print or plot is the operation taking place at this execution of PRINT 201, the power factor, which is ordinarily stored in bits twelve through fifteen of the B register 302, is not changed from its zero value to which it was set previously at block 37 (FIG. 5). Likewise, appropriate for a carriage return, the A register 301 (FIG. 7) is not changed from its zero value (representing no dot pattern) to which it was set previously at block 257. After the operation corresponding to block 213 is executed, control is returned from the PRINT program 201 to the PPLOT program at block 95 (FIG. 5), for subsequent output to the print-plot controller 303 (FIG. 8) of the A and B register information.

The preceding is an explanation of how a carriage return is performed by the PRINT program 201 during a printing operation. The following is an explanation of how the print-plot head 29 (FIG. 3) is repositioned for plotting after a printing operation. If the STEP variable at block 203 is found to be zero, and if, as block 205 shows, no more characters remain to be printed, the PRINT program 201 then tests if any data remains to be plotted. As block 215 shows, if no data remains to be plotted, control is transferred from PRINT 201 to PPLOT 33 (FIG. 5) at block 97. If data remains to be plotted, the present position of the print-plot head 29 (FIG. 3) is compared with the variable POINT representing the position of the last data value plotted. If, as block 217 shows, the present position of the head 29 is greater than (i.e., is positioned to the right of) the last data value plotted, the POS variable is reset in block 219 to three hundred and forty-two units less than its present value (i.e., to the left of its present position, along the Y axis 26 in the direction of decreasing amplitude). As indicated previously in block 207, the subtrahend three hundred and forty-two represents one move of the print-plot head 29 equivalent to 0.078 inches. This repositioning of the head 29 0.078 inches at a time, occurs each successive execution of PRINT 201 until the POS variable is set to a position left of the last plotted point, in which case, as block 211 shows, the POS variable is reset to a value equal to the variable POINT representing the position of the last data value plotted. After the head 29 is repositioned thus to resume plotting, the qualifying variables LFED and N (representing a linefeed flag and a character-column counter respectively, set elsewhere in the PRINT program 201 at blocks 235 and 239) are reset to zero as shown in block 223. Following which, block 225 is executed setting only the sign bit of the A register 301 (FIG. 7) to one, indicating that no dot pattern (represented by zeroes in bits eight through fourteen) is to be printed, because this was merely a head 29 (FIG. 3) repositioning operation and not an actual print operation. Next, as shown by block 213, the head position information represented by the variable POS is stored in bits zero through eleven of the B register 302 (FIG. 7), after which control is returned to PPLOT 33 (FIG. 5) at block 95. Bits 12 through 15 of B 302 (FIG. 7) remains zeroes, as set previously at block 37 to PPLOT 33 (FIG. 5), reflecting zero power to the head 29 (FIG. 3). Note that when head repositioning occurs, no chart advance takes place; this is shown by the zero value of the STEP variable as execution proceeds from block 203 to block 205.

Figure 8:
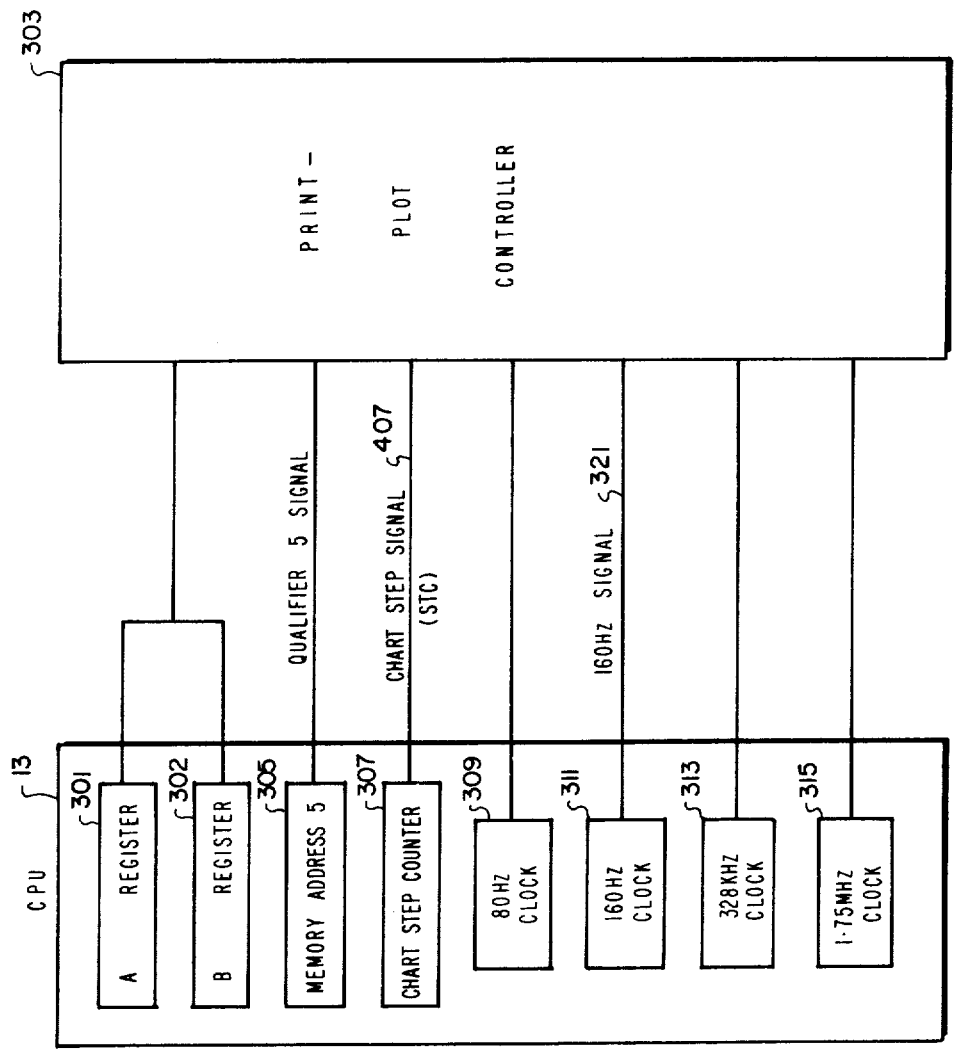
FIG. 8 is a block diagram illustrating the interface between the central processing unit and the print-plot controller.

In the foregoing, the manner in which the head 29 is repositioned for plotting following a printing operation is discussed. In the discussion that follows, the format (dot pattern) of the characters to be printed is described, together with an explanation of how the printing of each segment (dot column) of the character is accomplished. As mentioned earlier, characters 31 (FIG. 4) are printed in a five-columns by seven-rows dot matrix format, with two space columns between characters. If a character is to be printed, as block 205 shows, PRINT 201 determines at block 227 the particular column of the character to be printed, by determining the value of N, a character-column indicator variable. The value of N (originally initialized to zero) is set to seven at block 239 when all five columns of a character are to be printed followed by two space columns 31. The value of N is later decremented to zero, at block 255, after the seventh column (i.e., the second space column following the character) is printed. If a new character is to be printed (i.e., if the value of the column variable N is found to be zero at block 227), the address or location in computer memory 14 (FIG. 1) of the character to be printed is loaded into the B register 302 (FIG. 7) right justified, as block 229 shows, and the ASCII code corresponding to the character is loaded into bits zero through seven of the A register 301, as shown by block 231. If the character to be printed is a linefeed character, the LFED variable is set to 1, as blocks 233 and 235 show, otherwise it remains zero. Following which, as block 237 indicates, the starting address of five words in computer memory 14 (FIG. 1) containing the dot patterns corresponding to the five column 31 (FIG. 4) of the character to be printed is stored in the variable M. This address in the variable M is later used to store the actual column dot patterns as hereinafter described in block 245. For economy of storage, five computer words (16 bits each) are used to contain the dot pattern of two characters. The most significant eight bits (i.e., left half) of the 5 words represent one character whose ASCII code is odd, while the least significant eight bits (i.e., right half) of the five words represent another character whose ASCII code is even. An odd or even code is a code with its least significant bit set to one or zero, respectively. If the ASCII code of the character to be printed (determined at block 231) is odd, the character identification variable CHRPR is set to one, otherwise it is set to zero. Next, as block 239 shows, the column indicator variable N is set to seven, preparatory to the printing of all five columns of a character followed by two space columns. In the event the character was only partly printed and other columns of the character remain to be printed, the column indicator variable at block 227 would have been nonzero, in which case block 241 would be executed next. Resetting of the column indicator variable to seven at block 239 only occurs when a character exists for printing and no partly completed characters exist to be completed. At block 241, a test is made to determine if the second space column following a character is to be printed. This is indicated by the column indicator variable N equal to one, specifying one remaining column to be printed (viz., the second space column following a character). If the second space column is not to be printed, a further test is made at block 243 to determine if the first space column following the character is to be printed. If no space column, but one of the five columns of the character itself, is to be printed, a block 245 is executed which causes the dot pattern of a particular column of two characters to be loaded into the A register 301 (FIG. 7), depending on the value of the column indicator variable N. If the value of the column indicator variable N is seven, six, five, four or three, the dot pattern of column one, two, three, four or five, respectively, of the character, is loaded into the A register 301 from memory locations represented by the address variable M, M+1, M+2, M+3 and M+4. After the contents of a memory location is loaded into the A register 301 the address variable M is incremented, as shown in block 247, so as to point to the next memory location. Thereafter, as block 249 shows, the column dot-pattern for the character to be printed is selected from the left or right half of the A register 301, according as the value of the character identification variable CHRPR is one or zero, respectively. As block 251 shows, the dot pattern thus selected is then shifted into bits eight through fourteen of the A register 301 for later output at block 95 (FIG. 5) to the print-plot controller 303 (FIG. 8). At block 253, the ASCII code of the character to be printed is also stored in the A register 301 (FIG. 7), in bits zero through seven. After which, at block 255, the column indicator N is reset so as to point to the next column of the character to be printed, and the position variable POS is incremented so as to specify the next position of the print-plot head 29 (FIG. 3) corresponding to the column to be printed.

It should be noted, that unlike the plotting operation where the power factor that is applied to the head 29 (FIG. 3) is a nonzero value which is stored in bits 12 through 15 of the B register 302 (FIG. 7), as shown in block 89 of FIG. 5, in a print operation, bits twelve through fifteen are kept equal to zero, as originally set by block 37 (FIG. 5). These bits are not used to specify power for printing. When printing is to be performed, a constant power of two and three-tenths watts are applied per dot, pulsed every 1/160 second. Like the plot operation shown at block 91 of FIG. 5, however, bits zero through eleven of the B register 302 (FIG. 7) are made to contain head position information for printing, as shown by block 213, FIG. 6.

The preceding explains how the individual segments (five dot columns) of a character are printed. The following explains how the spaces separating each character are generated. After all five columns of a character are printed, the first and second space columns following the character are printed. The completion of a character and, hence, the readiness of the PRINT Program 201 to print the first space column following the character, is indicated by an N (the column indicator) of two. As block 243 shows, if N equals two, the A register 301 (FIG. 7) is cleared to zero, corresponding to a space character with no bit pattern. After the first space column is printed, the second space column (indicated by N equal to one) is next printed. As shown by blocks 241, 259 and 261, if the column indicator variable N is set to one, the variable K, representing the number of characters that remain to be printed, is decremented by one each time that a character is printed, and the variable P, representing the number of characters already printed, is increased by one. Thereafter, as block 263 shows, if the last character printed is not a linefeed character, block 257 is executed next. Otherwise, if the last character printed is a linefeed character (in which case the linefeed variable LFED would have been set equal to one at block 235), the STEP variable is incremented by 96, as shown by block 265. One linefeed character is equivalent to ninety-six advances or steps of the chart 27 (FIG. 3), and each step is equivalent to a linear motion of the chart of 0.0413 mm. After block 265 is executed, program execution proceeds to block 223 and other blocks hereinbefore discussed.

Figure 6:
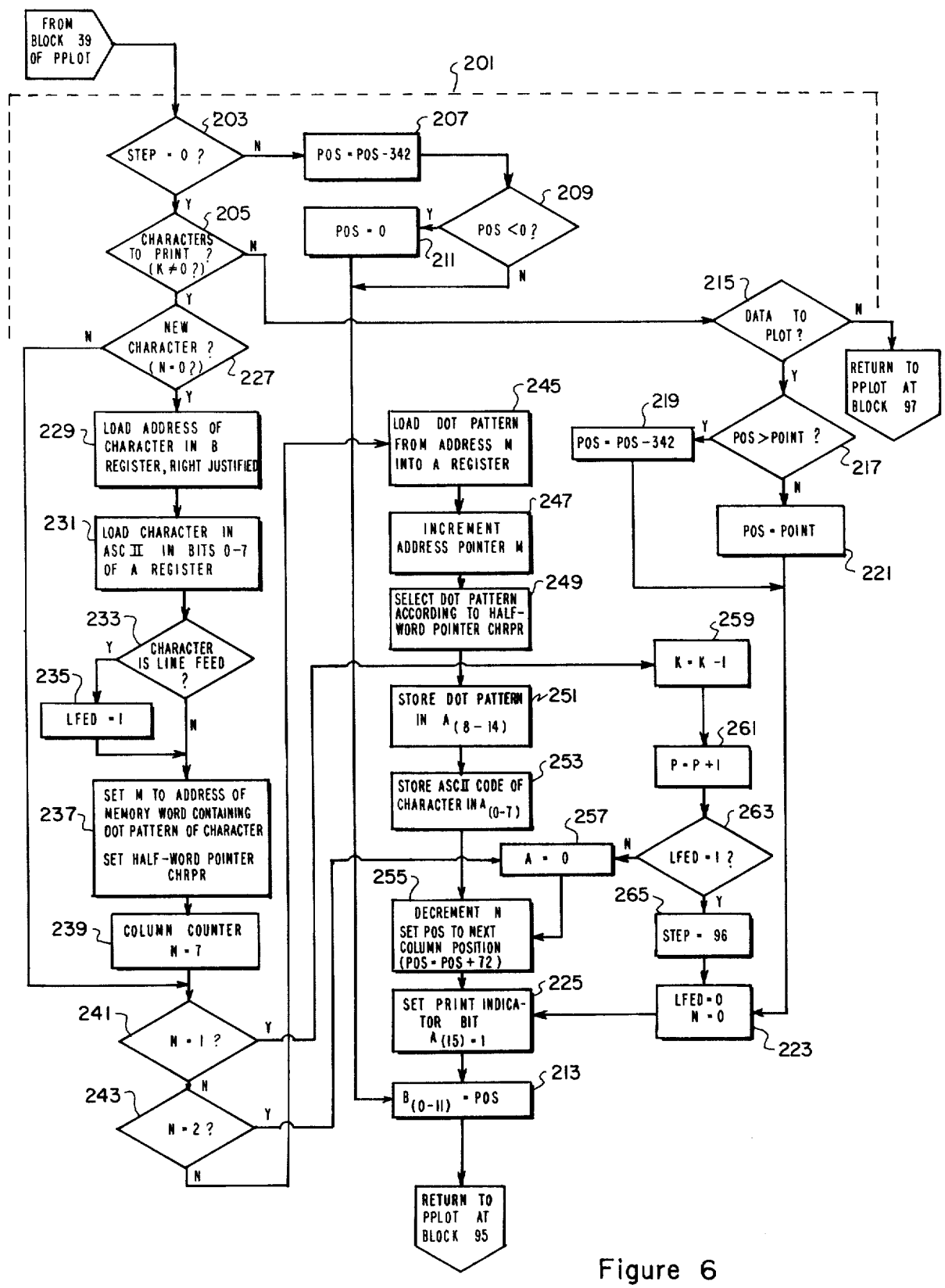
FIG. 6 is a logic flow diagram illustrating another mode of operation of the system.
Figure 10:
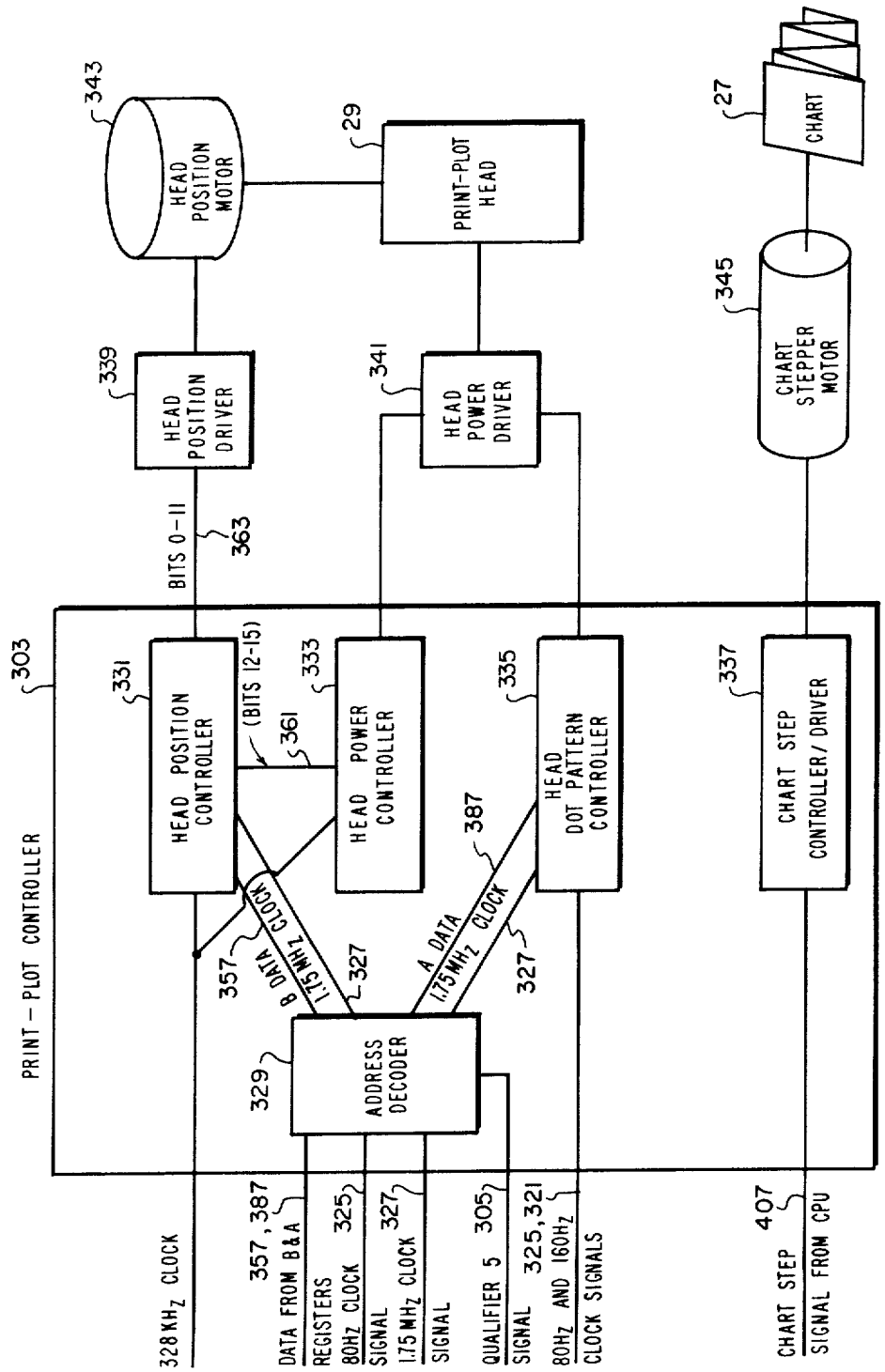
FIG. 10 is a block diagram illustrating the components of the print-plot controller.

The preceding describes how head position, head power and dot pattern data are prepared by the CPU 13 (FIG. 1) for printing or plotting, under control of the programs PPLOT 33 (FIG. 5) and PRINT 201 (FIG. 6). The following describes the configuration of the system that prints and plots this CPU-prepared data. As block 95 (FIG. 5) shows, the CPU-prepared data is first stored in the A and B registers 301, 302 prior to printing or plotting. FIG. 7 shows the format of data stored in these two registers. FIG. 8 shows how this data is then applied from the A and B registers 301, 302 of the CPU 13 to the print-plot controller 303 for printing or plotting. Upon execution of three programmed commands at block 95 of FIG. 5 (one "output from B" command followed by a clear flag 5 command and an "output from A" command), the data from the B register 302, FIG. 8 is transferred to the print-plot controller 303, followed by the data from the A register 301. The clear flag 5 command is used to clear or set the condition for the transfer of the A register data following transfer of the B register data. As FIG. 7 shows, printing is performed if bit 15 of the A register 301 is one; plotting is performed if bit 15 is zero. FIG. 10 shows the print-plot controller 303 and an address decoder 329 within the controller, that routes the data from the B register 302 to a head position controller 331, and the data from the A register 301 to a head dot-pattern controller 335. These controllers are described in greater detail hereinafter.

Figure 9B:
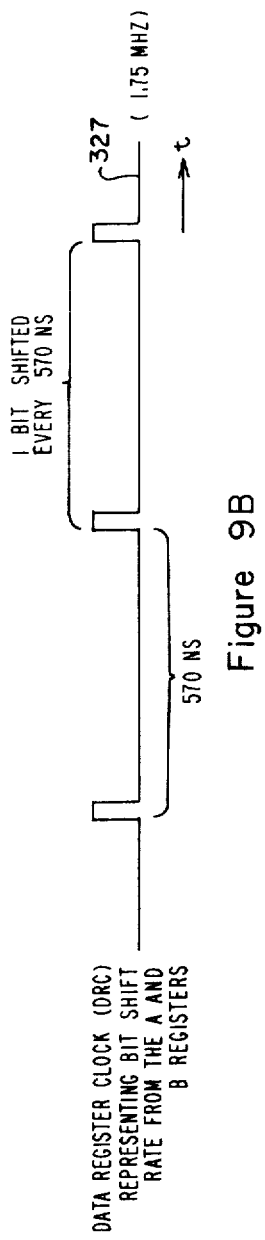
FIGS. 9(a) and 9(b) are timing diagrams illustrating certain operational phases of the system.
Figure 9A:
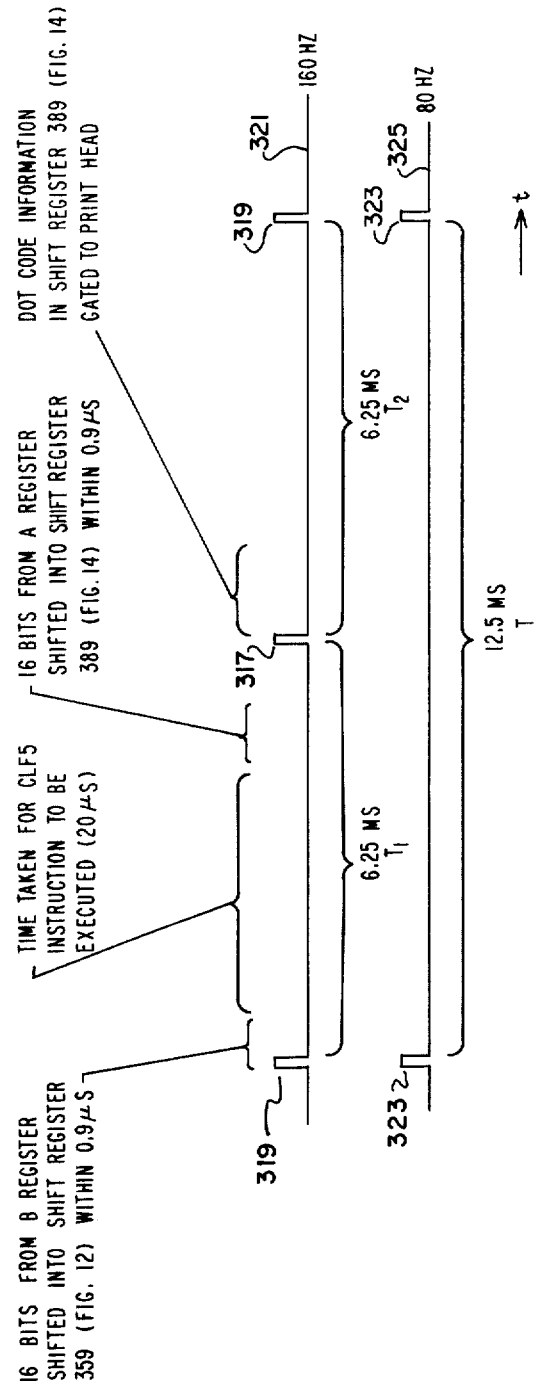
Figure 11:
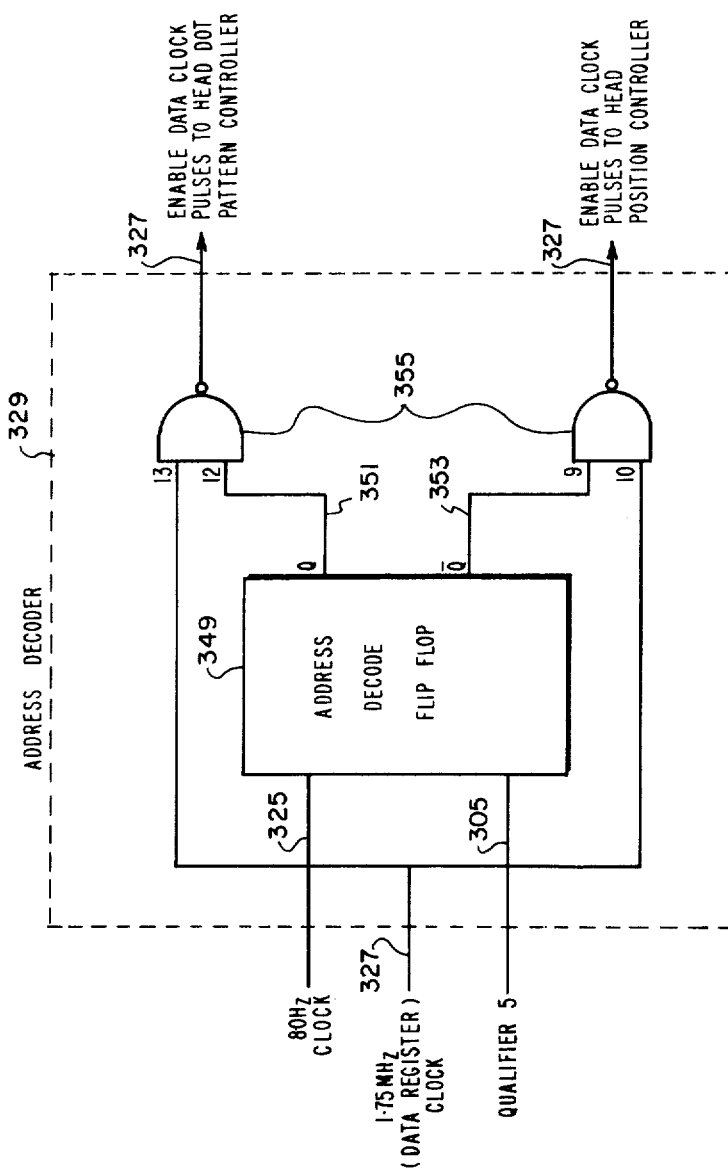
FIG. 11 is a combined block and schematic diagram illustrating the address decoder.

Output data from the B and A registers 302, 301 to the head position and dot-pattern controllers 331, 335 are synchronized by three clock pulses, shown in FIGS. 9A, 9B and 10 (a 12.5 ms pulse 325, a 6.25 ms pulse 321, and a 570 ns pulse 327), generated by an 80 Hz clock 309 (FIG. 8), a 160 Hz clock 311 and a 1.75 MHz clock 315 within the CPU 13. As FIGS. 9A and 9B show, the 80 Hz clock pulse 325 triggers the transfer of data from the B and A registers 302, 301 (FIG. 10) to the head position and dot pattern controllers 331, 335. The transfer of all sixteen bits of the B register 302 and all sixteen bits of the A register 301 is completed within a few microseconds of the 80 Hz trigger pulse 323 shown in FIG. 9A, and well before a 160 Hz pulse 317 occurring 6.25 ms after the trigger pulse. The rate at which the individual bits are shifted is one bit every 570 ns, as shown in FIG. 9B, synchronized to the pulses of the 1.75 MHz clock 315 (FIG. 8). Exactly 6.25 ms after the occurrence of the 80 Hz pulse 323, a 160 Hz pulse 317 occurs, as shown in FIG. 9A, triggering the gating of the dot code information (shifted from bits 8–14 of the A register) to the print-plot head 29, FIG. 10. Output of data from the B and A registers, 302, 301 and the subsequent printing or plotting of this data both occur within one period (12.5 ms) of the 80 Hz signal 325 (FIG. 9A). FIG. 11 illustrates the design of the address decoder 329. This decoder comprises an address decode S-R flip-flop 349 which allows data to pass to the head position controller 331 when the flip-flop 349 is in one state, and to pass to the head dot-pattern controller 335 when the flip-flop 349 is in its other state. The state of the flip-flop 349 is controlled by the condition of a qualifier (flag five) line 305. This line is initialized "true" (i.e., preset high), and is cleared (i.e., set low) to "not true" by CLF5 (clear flag five) program instruction as shown by block 95 of FIG. 5. The 80 Hz timing pulse 325 (FIG. 11) is applied to the clear terminal of the address decode flip-flop 349 to clear the flip-flop at the beginning of each 12.5 ms period 325 (FIG. 9A). The qualifier five 305 (FIG. 11) is preset high, the output $\overline{Q}$ 353 from the flip-flop 349 and, hence, pin nine of a Nand gate 355 is set high allowing the data register clock (DRC) pulses 327 (corresponding to a clock rate of 1.75 MHz for transfer of the data bits themselves) to pass to the head position controller 331. If qualifier five 305 is set low, the state of the flip-flop 349 changes, causing output Q 351 of the flip-flop 349 and pin twelve of 355 to be set high, thereby allowing the data register clock (DRC) pulses 327 to pass to the head dot-pattern controller 335. (Qualifier five 305 is set low upon the execution of a CLF5 command after the "output B" command and before the "output A" command shown in block 95 (FIG. 5). The execution of CLF5 causes the gating of a clear pulse to the preset terminal of the flip-flop 349 setting qualifier five low.)

Figure 12:
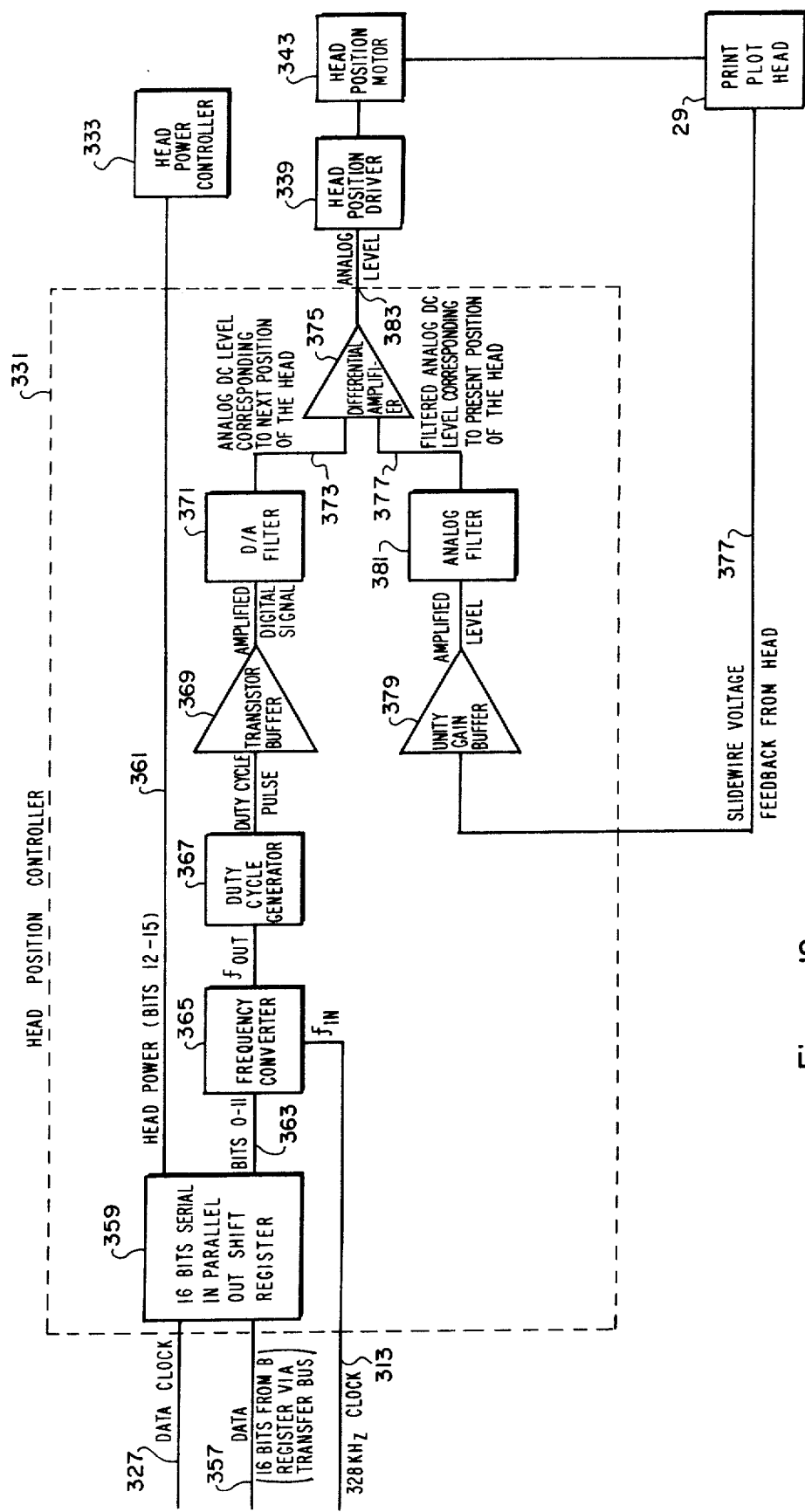
FIG. 12 is a block diagram illustrating the print-plot head position controller.

As explained above and as shown in FIG. 10, the address decoder 329 enables data from the B register 302 to pass to the head position controller 331. As FIG. 12 shows, this data 357 is serially shifted into a sixteen-bit shift register 359 synchronized to the 1.75 MHz data clock 327. Four bits 361 of the data (bits 12–15, representing head power) are then shifted out of the shift register 359 into the head power controller 333. The remaining 12 bits 363, representing head position data, are shifted into a frequency converter 365 which converts the head position data to a signal having a frequency ($F_{out}$) in the range 0 Hz to 328 KHz. Conversion is performed as follows:

$$F_{out} = F_{in}/4096$$

where 4096 is the number of different head positions (0 through 4095, represented by bits 0–11) to which the print-plot head 29 can be moved across the plottable width of the page 28 (FIG. 3); and, $F_{in}$ is an input frequency of 328 KHz 313 (FIG. 12) which allows any of the 4096 possible head movements to be determined within the basic 12.5 milliseconds period 325 (FIG. 9A). For example, a pulse with frequency $F_{out}$ = 328KHz/4096 = 80 Hz is a pulse with a 12.5 ms period; a pulse with frequency $F_{out}$ = 328KHz/2048 = 160 Hz is a pulse with 6.25 ms period, corresponding to a head movement well within the basic 12.5 ms period.

The output signal ($F_{out}$) from the frequency converter 365 is applied to a duty cycle generator 367 which generates a duty cycle pulse proportional to the frequency of the input signal. For example, a duty cycle pulse corresponding to a 160 Hz input signal (represented by bits 0–11 equal to 2048) is shown in FIG. 13. After a duty cycle pulse is generated by the duty cycle generator 367 (FIG. 12) the pulse is fed to a transistor buffer 369 which amplifies both current and voltage, and applies the amplified digital signal to a two-pole digital to analog filter 371. The D/A filter 371 first converts the amplified digital signal to an analog DC level 373, representing the next position to which the head 29 is to be moved, then outputs the DC signal 373 to the positive input of a differential amplifier 373 which compares the DC signal 373 with another DC signal 377 representing the then current position of the head 29. The signal 377 representing the then current position of the head 29 is transmitted to the negative input of the differential amplifier 375 from the head 29, in the form of a slidewire voltage level 377. Before entering the differential amplifier 375, however, the feedback signal 377 is current-amplified by means of a unity gain buffer 379 then filtered by means of an analog filter 381 to remove oscillations.

Figure 19:
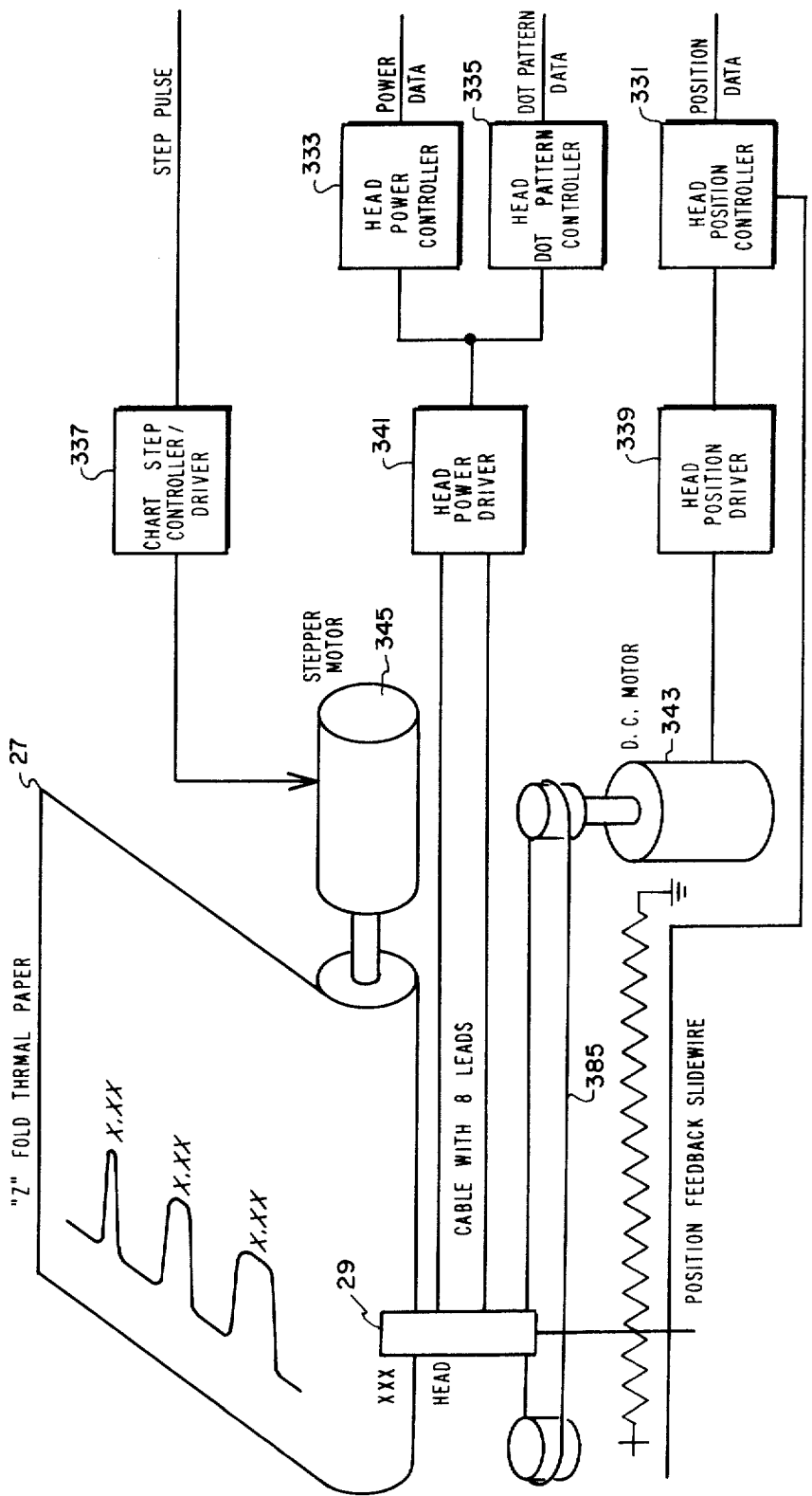
FIG. 19 is a combined perspective view and block diagram illustrating the controller and driving circuitry for the print-plot head and the chart drive.

The differential amplifier 375 compares the input signal 373 (representing the new position to which the head 29 is to be moved) with the input signal 377 (representing the last head position), and outputs to the head position driver 339 a signal 383 representing the voltage difference, $\Delta V$, between the two input signals 373, 377. This voltage difference, $\Delta V$, 383 represents the amount that the head 29 is to be moved right or left of its present position, i.e., right in the direction of increasing amplitude 26 (FIG. 3) if $\Delta V$ is positive, or left in the direction of decreasing amplitude if $\Delta V$ is negative. The magnitude of $\Delta V$ is a value in the range 0 to 10 volts. Zero volts represent no motion of the head 29 (FIG. 12) signifying that the new head position is the same as the present head position, while 10 volts represent maximum head motion (e.g., from left edge of page to right edge or vice versa). As the head 29 moves from its old position to its new position, the magnitude of $\Delta V$ decreases until it equals zero, indicating that the slidewire feedback voltage 377 (representing the actual position of the head 29) is now equal to the new position voltage 373, and that the head has therefore reached its new position. The $\Delta V$ signal 383 from the differential amplifier 375 is applied to the head position driver 339 which further amplifies the current and voltage of the signal thereby producing, by means of two power transistors incorporated in the driver 339, sufficient power to drive the head position motor 343. The head position motor 343 operates in the range zero to ten volts, with zero volts representing no movement of the head 29, and 10 volts representing a maximum movement of 7.5 in. in 0.5 seconds, from one plottable edge of the paper 28 (FIG. 3) to the other. As FIG. 19 shows, a slidewire 385 connects the head 29 to the head position motor 343. As a $\Delta V$ is applied to the motor, the slidewire and head are moved to the position corresponding to a $\Delta V$ of zero.

The preceding explains how the head position data (bits 0–13) from the B register 302 (FIG. 7) are used to position the head 29 for printing or plotting. The following is an explanation of how dot code data from the A register 301 are used to produce characters for printing. As indicated earlier, the address decoder 329 (FIG. 10) enables data from the A and B registers 301, 302 to pass to the head dot-pattern controller 335 and to the head position controller 331, respectively. Upon the execution of a CLF5 (clear qualifier 5) command at block 95 (FIG. 5), the qualifier five line 305 (FIG. 11) is set low, changing the state of the S-R flip-flop 349; this causes output Q 351 of the flip-flop and pin twelve and Nand gate U-One 355 to be set high allowing the 1.75 MHz data clock pulses 327 to pass to the head dot-pattern controller 335.

As FIG. 14 shows, the data 387 from the A register is serially shifted into an eight-bit shift register 389 synchronized to the 1.75 MHz data clock signal 327. Because the shift register 389 is an eight-bit rather than a sixteen-bit register, bits zero through seven are shifted through and lost, while bits eight through 15 are retained. If bit 15 is one, indicating that a print operation is to be performed, the preset mode (pin seven) of a print-control flip-flop 391 is released so that the next 160 Hz clock pulse 321 causes the flip-flop 391 to toggle. When the flip-flop 391 toggles, the output Q (pin 10) goes high enabling the dot code data (bits 8–14) to the head power gates of the head power driver 341. A subsequent 160 Hz pulse 321 then causes the print flip-flop 391 to return to the $\overline{Q}$ (low) state which disables the power gates of the head power driver 341 thereby removing power from the print-plot head 29. Coincident with the 160 Hz pulse 321 is an 80 Hz pulse 325 which clears the shift register 389 causing the bit 15 output line to go low, thereby placing the print flip-flop 391 in a preset mode until data from the A register 387 is again ready for transfer to the head dot-pattern controller 335. The output (Q) from the print flip-flop 391 is also used as a duty cycle by the head power driver 341 to control the amount of power for printing. The output (Q) from the print flip-flop 391 is interpreted as a fifty percent duty cycle pulse, which is high fifty percent of the time (i.e., set high by the 160 Hz pulse 317 during the period $T_2$, as shown in FIG. 9A) and low 50 percent of the time (i.e., set low during the remainder time T by the 160 Hz pulse 319). This fifty percent duty cycle pulse (Q) is used by the head power driver 341 (FIG. 14) to apply peak power (2.3 watts for printing) to the head 29 during the period $T_2$ and to turn off power from the head 29 during the other half of the period T. This results in an average power of 1.15 watts to each resistor element of the head 29 for purposes of printing during each 12.5 ms period (T) of the basic 80 Hz pulse 325.

Figure 15:
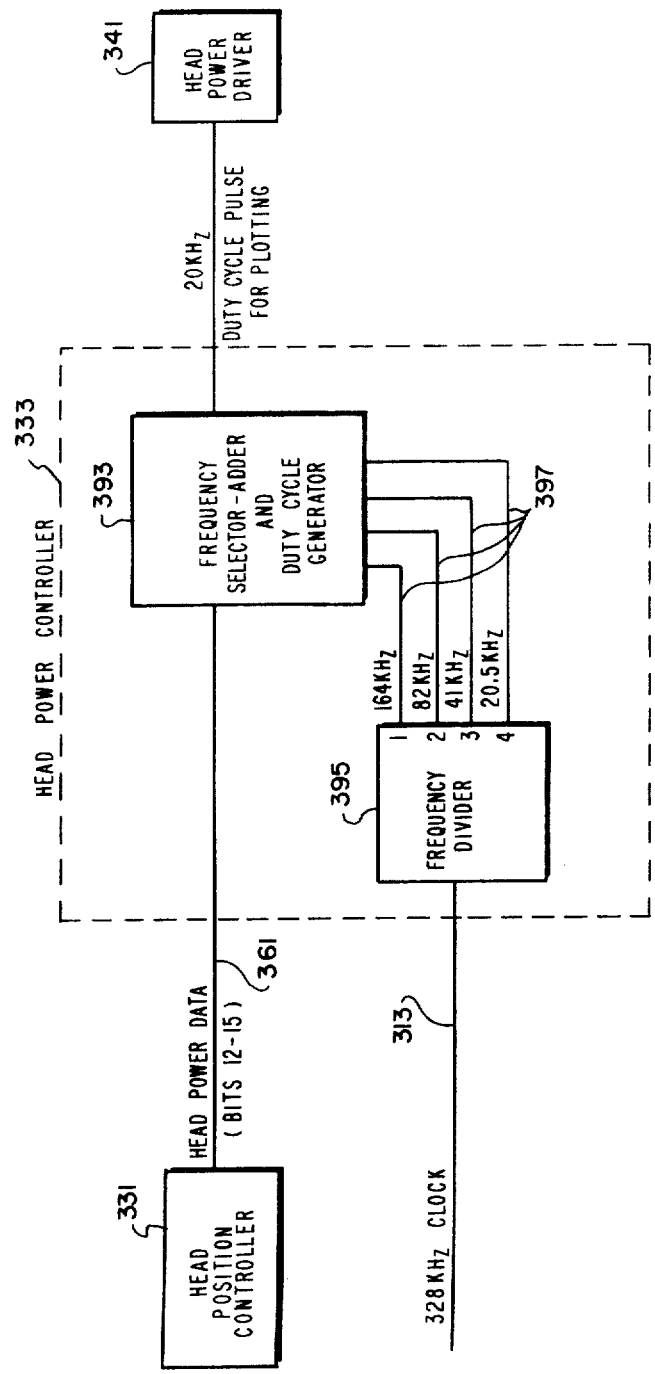
FIG. 15 is a block diagram of the print-plot head power controller.
Figure 16:
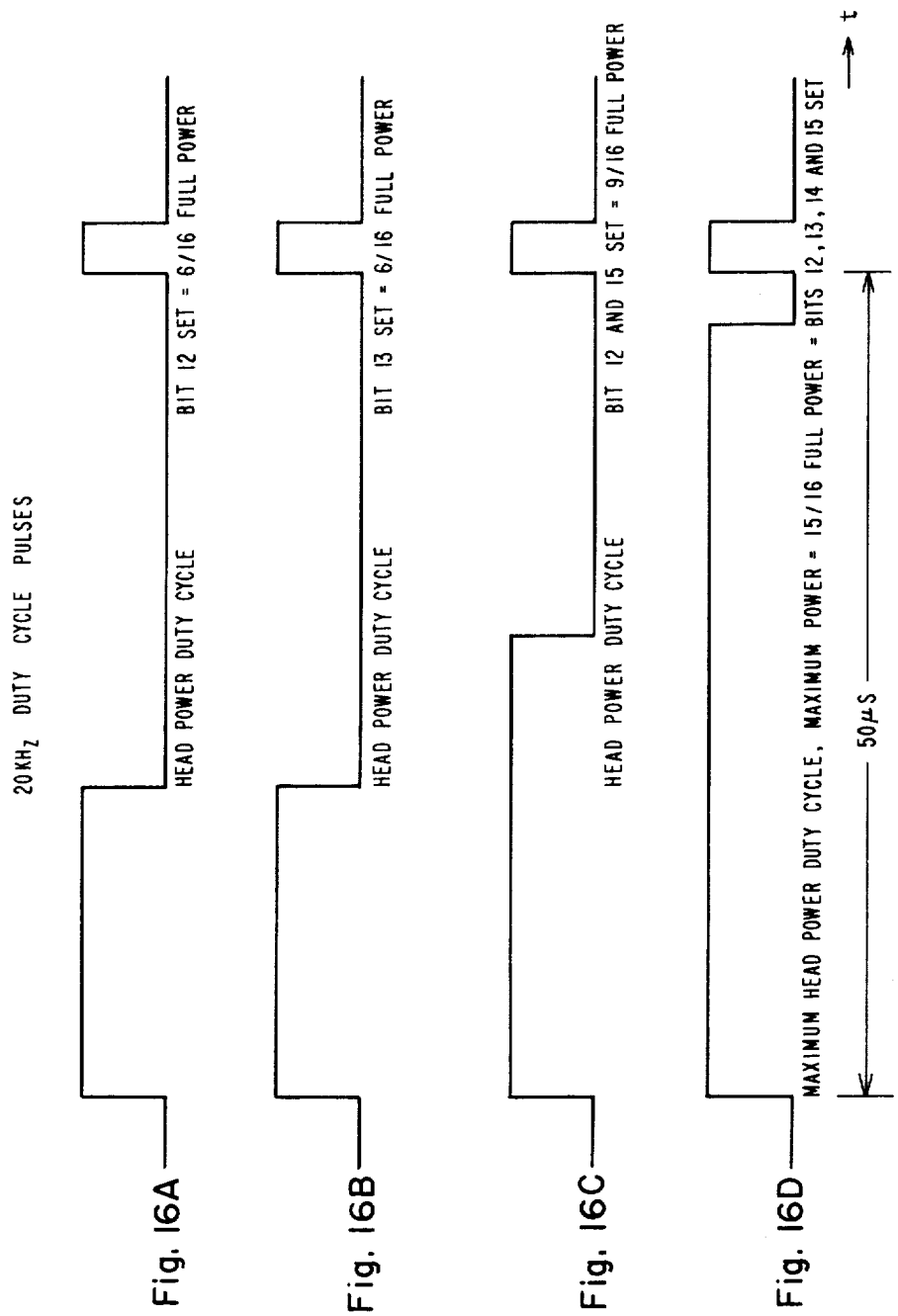
FIGS. 16(a)–16(d) are waveform diagrams illustrating duty cycles of power pulses applied to the print-plot head.

The preceding describes how dot code data is transferred by the head dot-pattern controller 335 from the A register 301 to the head power driver 341 for printing. The head power driver 341 is described in greater detail hereinafter. The operation of the head power controller 333 (FIG. 15) is described next. This conoller specifies, in terms of a power-control pulse (a duty cycle pulse), the amount of power that is to be used by the head power driver 341 (FIG. 15) for plotting. For purposes of plotting, power to the head 29 is controlled by a head power controller 333. As FIG. 15 shows, the head power data 361 is output from the head position controller 331 and applied to a frequency selector-adder/duty cycle generator 393 within the head power controller 333. The output of a four-bit frequency divider flip-flop (actually four J-K flip-flops) 395 is also applied to the frequency selector-adder 393. The four-bit frequency divider 395 receives as input a 328 KHz clock signal 313 and divides this 328 KHz input frequency down to four lower frequencies 397. The frequency divider 395 does this by changing the rate of bit one each cycle of the input signal 313, bit two each second cycle, bit three each fourth cycle and bit four each eighth cycle. The four lower-frequency signals 397 generated thereby are then output from the frequency divider 395 and applied to a frequency selector-adder 393, which uses the four signals 397 to generate a duty cycle pulse (power control pulse) to the head power driver 341. The frequency selector adder 393 selects one or more of the signals 397, depending on whether bits twelve, thirteen, fourteen or fifteen of the head power data 361 is one (set). If bit twelve, bit thirteen, bit fourteen, or bit fifteen of the head power data 361 from the head position controller 331 is set, the 20.5 KHz, 41 KHz, 82 KHz or 164 KHz signal is selected, respectively. The frequencies of the selected signals are then added (counted) to determine what multiple of 20 KHz they are. For example, if only bit thirteen of the head power data 361 is set, the 41 KHz pulse would be selected and counted as a pulse with a frequency twice that of 20 KHz. The count two would then be used by the duty cycle generator 393 to generate a duty cycle as shown in FIG. 16B. FIG. 16A depicts a duty cycle corresponding to a count of one. FIG. 16C shows a duty cycle corresponding to a count of nine. This is achieved when both bits twelve and fifteen are set and bits thirteen and fourteen are not set, thereby permitting the selection of signals 397 with frequencies of 164 KHz and 20.5 KHz, resulting in a cumulated count of nine. FIG. 16D shows a duty cycle corresponding to a count of fifteen representing 15/16 of full power, which is the maximum power used for plotting. The duty cycle pulse generated by the duty cycle generator 393 (FIG. 15) is then input to the head power driver 341 to regulate power to the head 29.

Figure 17:
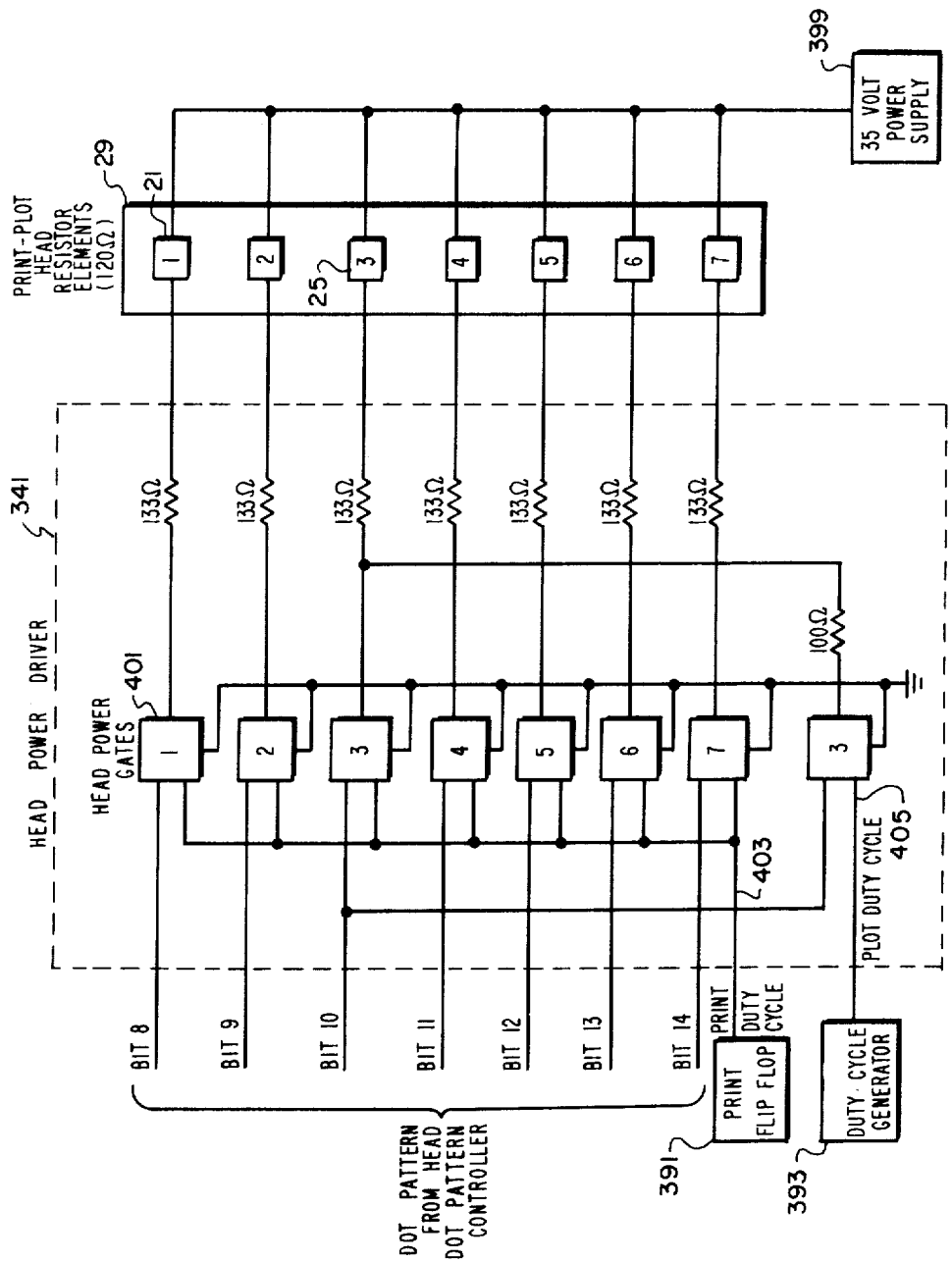
FIG. 17 is a combined block and schematic diagram of the power driver for the print-plot head.

FIG. 17 shows the head power driver 341. Power to the individual resistor elements 21 of the head 29 is regulated by the head power driver 341. When printing is to be performed, the driver 341 applies power to the resistor elements 21 according to the dot pattern (bits 8–14) received from the head dot pattern controller, and according to the print duty cycle pulse received from the print flip-flop 391 within the head dot-pattern controller 335 (FIG. 14). When plotting is to be performed, the head power driver 341 applies power to one of the resistor elements 25 according to the plot duty cycle pulse received within the head power controller 333 (FIG. 15). For printing, 133 ohm resistor circuits are used in conjunction with a 35 volt source 399 (FIG. 17) to provide a power level of 2.3 watts to each of the seven resistor elements 21 depending on which head power gate 401 is open. If printing is to be performed, as indicated by bit 15 of the data from the A register 301 (FIG. 7) equal to one, the print flip-flop 391 enables the head power gates 401. This causes the individual gates 401 to be opened when bit eight, nine, 10, 11, 12, 13 or 14 of the input data (dot code data) is set, thereby permitting power from the 35 volt source 399 to be applied to individual elements 21 of the head 29. For plotting, a resistor circuit containing a 100 ohm resistor in series with a 133 ohm resistor is used in conjunction with the thirty-five volt source 399 to provide a power level of 1.18 watts to resistor element 325. When plotting is to be performed, as indicated by bit 15 of the data from the A register 301 (FIG. 7) equal to zero, the head power gates 401 (FIG. 17) are not enabled by the print flip-flop 391. Instead, the duty cycle generator 393 causes head power gate No. 3 to open permitting power from the 35 volt source 399 to be applied to resistor element number 325.

Power is gated to the resistor elements 21 of the head 29 for the period of time specified by the print or by the plot duty cycle 403, 405. For printing, power is "on" (gated to the resistor elements 21) for 6.25 ms of each 12.5 ms period shown in FIG. 13. For plotting, power varies with the velocity of the head 29, and may be "on" for 6/16 and "off" 10/16 of each 50 µs period shown in FIG. 16A; or, power may be "on" for as long as 15/16 and "off" 1/16 of each 50 µs period shown in FIG. 16D. Power is applied at the beginning of each cycle of the duty cycle pulse, i.e., at the beginning of each 50 µs period shown in FIG. 16 for plotting or at the beginning of each 12.5 ms period shown in FIG. 13, for printing. Power remains on during the duty period of the pulse and is turned off during the no-duty period of the pulse. The longer the duty period of a duty cycle pulse, the longer the period of time that power is applied to the head 29 and hence the greater the temperature build-up of the resistor elements 21 of the head 29. Thermal printing or plotting is accomplished by an amount of thermal energy transferred from the head 29 to the thermal paper 27 (FIG. 3). This amount of energy may be represented as the product of two factors: The temperature of the head elements 21, and the period of time that these elements 21 are in contact with the thermal paper 27 (FIG. 3). The velocity of the head 29 governs the period of time that the head 29 is in contact with a given segment of the paper 27. The higher the head velocity, the less time the head is in contact with a given segment of the paper 27. Therefore, if contact time is shortened because of an increase in plotting rate (this occurs when plotting is resumed immediately after printing), then, in order for the product of temperature and contact time to remain constant, thereby ensuring a uniform trace, the temperature of the head elements 21 (FIG. 17) is increased as the head velocity increases. This relationship of head temperature to head velocity is expressed in terms of a head power factor (described previously in equation 4 and Table 1 herein). The power factor represents the duty period during which time power is applied to the head elements 21, resulting in a head temperature sufficient to produce a uniform trace at the head velocity calculated at block 79 (FIG. 5). The thermal response time of the head elements 21 is much slower than the duty cycle for plotting, i.e., a 1 millisecond thermal response time compared to a duty cycle period of 50 microseconds. This slower thermal response time of the head elements 21, in effect, averages the different temperatures produced for each different duty cycle (head power factor), causing the head elements 21 to reach a running average temperature. This also helps to produce a uniform trace or constant intensity line.

Figure 18:
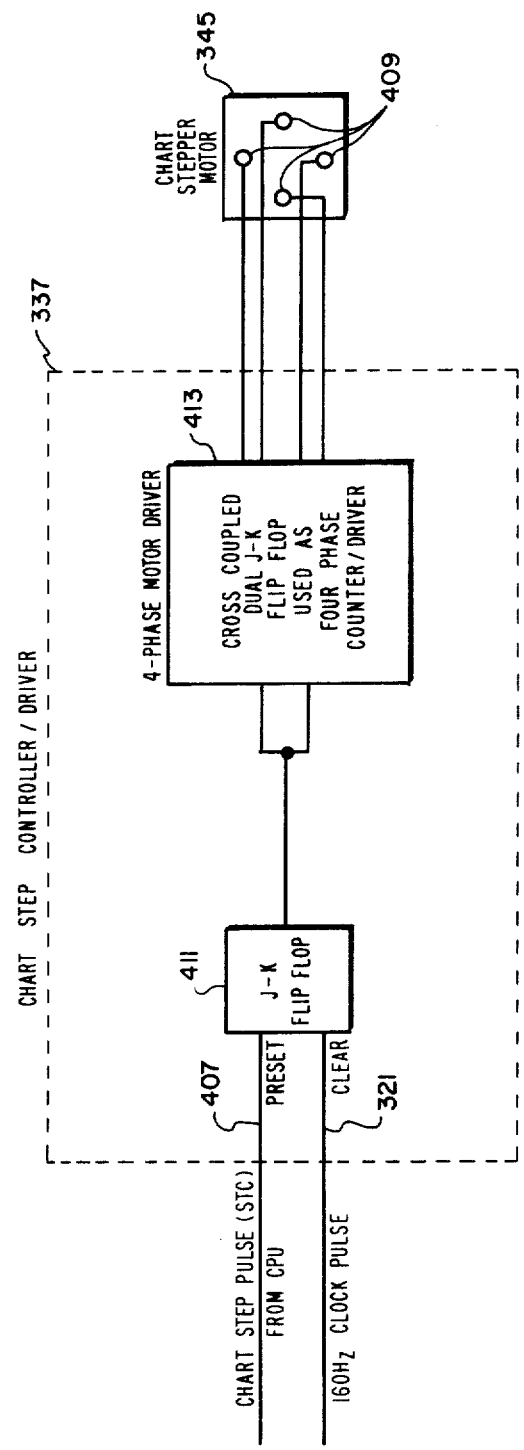
FIG. 18 is a combined block and schematic diagram of the controller and driver for stepping the chart recording paper.

In the preceding, the printing of characters and the plotting of data values have been described. Also described is the means by which the printer-plotter 11 (FIG. 1) maintains a uniform thermal trace despite changes in the velocity of the print-plot head 29 (FIG. 3). Turning now to FIG. 18 the chart 27 is advanced one step each time a chart step pulse 407 is issued by the CPU 13 (FIG. 8). A chart step pulse is issued each time a set control (STC) command is executed. This occurs each time block 101 of FIG. 5 is executed. The chart 27 (FIG. 3) is advanced one linear step of 0.0413 mm, for each 180° turn of the chart motor 345 (FIG. 18). To accomplish a 360° turn, four coils 409 in the chart motor 345 are used. For each step of the chart, two coils are energized to produce two 90° turns of the chart motor. The chart step pulse 407 is used to energize one coil and produce one 90° turn; another pulse; the 160 Hz clock pulse 321, is used to energize a second coil to produce another 90° turn, resulting in a total turn of 180° or one step. Both the chart step pulse 407 and the 160 Hz clock pulse 321 are applied to a J-K flip-flop 411 within the chart step controller 337. The chart step pulse 407 presets the flip-flop 411 causing the flip-flop to output a signal to a four-phase chart motor driver 413. The chart motor driver 413 is a cross-coupled J-K flip-flop used as a four phase counter having four output terminals, each of which is connected to one of the four coils 409 of the chart motor 345. The four coils 409 are energized in sequence, according to a counter within the four-phase counter-driver 413, so as to produce turns of the chart motor which are in phase. Coil one produces a 0° to 90° turn, coil two produces a 90° to 180° turn, coil three produces a 180° to 270° turn, coil four produces a 270° to 360° (0°) turn. Upon receiving an output signal from the J-K flip-flop 411, caused by the chart step pulse 407, the four phase counter-driver 413 energizes one of the four coils of the chart motor 345 thereby causing the motor to advance 90° (equivalent to ½ step of the chart). The motor 345 is then advanced an additional 90° (thereby producing an additional ½ step, to result in a full step of the chart) upon the occurence of the next 160 Hz clock pulse 321 following the occurrence of the chart step pulse 407. The 160 Hz clock pulse 321 is a 100 ns wide pulse. The positive edge of this pulse 321 is gated through to the four phase counterdriver 413 by the J-K flip-flop 411, causing the driver 413 to energize a coil of the chart motor 345. The negative edge of the clock pulse 321 resets the J-K flip-flop 411, preventing any further pulses to pass to the four-phase counter driver 413 until the next chart step pulse 407 is received from the CPU 13 (FIG. 8).

Figure 20:
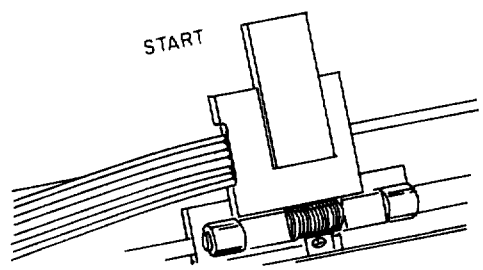
FIG. 20 is a perspective view of the print-plot head assembly.
Figure 21:
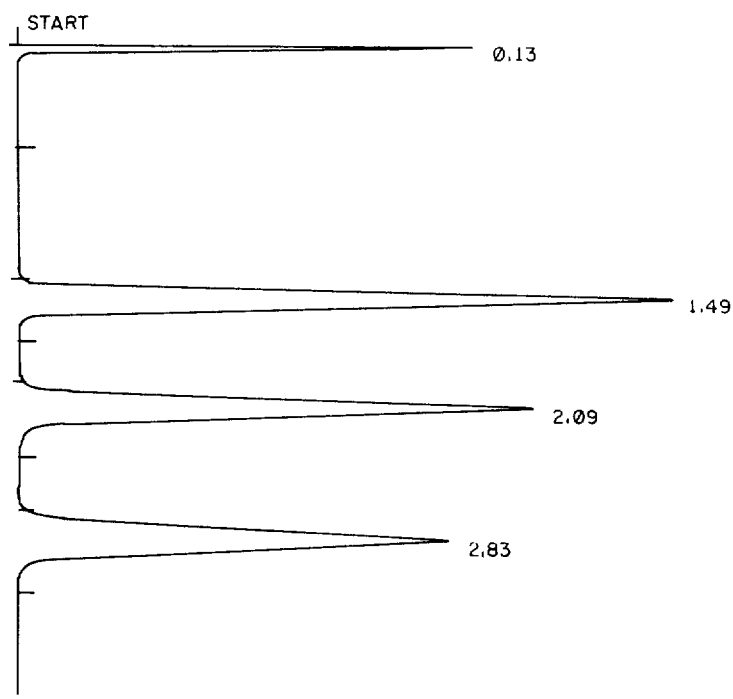
FIG. 21 is an output report on the recording paper of the printer-plotter unit.

From the foregoing, it can be seen that the velocity of the print-plot head 29 (FIG. 19) is used during plotting to modulate the power applied to the head, thereby ensuring a uniform trace. Also described is the means used to step or advance the chart paper during plotting and printing. An illustration of the print-plot head is presented in FIG. 20. Also, shown in FIG. 21 is an example of the characters printed and data plotted in real time, by the printer-plotter system 11 described herein.

We claim:
1. A system for presenting both analog and alphanumeric information on a recording medium, said system comprising:
   transducer means for providing a time varying signal;
   processing means responsive to said transducer means for operating on said signal to produce an analog output and an alphanumeric output;
   printer-plotter means responsive to said processing means for plotting said analog output and for interrupting said plotting to print said alphanumeric output on a real-time basis, said printer-plotter including: a platen;
   means for selectively advancing a recording medium on said platen;
   a print-plot head having a plurality of selectively energizable recording segments;
   means for moving said print-plot head across said platen;
   means for controlling said head moving means and said means for advancing said recording medium in response to both said analog output and said alphanumeric output; and
   means for energizing selected ones of said recording segments in a first mode to produce a continuous trace of said analog output, and in a second mode to product dot patterns representing said alphanumeric output.

2. The system of claim 1, said processing means including: means responsive to predetermined conditions of said analog output to produce a print control signal; and
   means for temporarily storing said analog output; and
   said printer-plotter means including means for interrupting the plotting of said analog output in response to said print control signal to print said alphanumeric output, and thereafter resuming tracing of said analog output from said storing means, thereby to produce a continuous trace annotated with alphanumeric data.

3. The system of claim 1, said processing means including:
   means responsive to said transducer signal for deriving successive data points representing said analog output; and means for calculating the required velocity of said print-plot head between successive data points to trace said analog output;
   said means for energizing said recording segments of said head including means operable in said first mode for applying variable power to said head in response to said calculated velocity, thereby to produce a uniform trace of said analog output.

4. The system of claim 3, wherein said energizing means applies variable power to one recording segment of said print-plot head.

5. The system of claim 3 wherein said means for energizing said recording segments of said print-plot head additionally includes means responsive to the alphanumeric output from said processing means and operable in said second mode for applying constant power to selected segments of said head to produce dot patterns representing portions of printed characters.

* * * * *

UNITED STATES PATENT AND TRADEMARK OFFICE
CERTIFICATE OF CORRECTION

PATENT NO. : 3,986,011
DATED : October 12, 1976
INVENTOR(S) : John S. Poole, et al.

It is certified that error appears in the above–identified patent and that said Letters Patent are hereby corrected as shown below:

Column 9, line 3, "block 211" should read -- block 221 --.

Signed and Sealed this

Fifteenth Day of March 1977

[SEAL]

Attest:

RUTH C. MASON
*Attesting Officer*

C. MARSHALL DANN
*Commissioner of Patents and Trademarks*